United States Patent
Bertram et al.

(10) Patent No.: US 7,367,171 B2
(45) Date of Patent: May 6, 2008

(54) VENTING SYSTEM FOR USE WITH A FOAM-IN BAG DISPENSING SYSTEM

(75) Inventors: George Bertram, Newton, CT (US); Doug Walker, Hamden, CT (US)

(73) Assignee: Intellipack, Tulsa, OK (US)

( * ) Notice: Subject to any disclaimer, the term of this patent is extended or adjusted under 35 U.S.C. 154(b) by 0 days.

(21) Appl. No.: 11/333,538

(22) Filed: Jan. 18, 2006

(65) Prior Publication Data

US 2006/0219314 A1    Oct. 5, 2006

Related U.S. Application Data

(60) Provisional application No. 60/644,523, filed on Jan. 19, 2005.

(51) Int. Cl.
*B65B 9/06*    (2006.01)
(52) U.S. Cl. .......................... 53/551; 53/133.1; 53/558
(58) Field of Classification Search ............... 53/128.1, 53/133.1, 451, 452, 472, 474, 551, 558, 559; 83/425.2, 937, 425.3, 949
See application file for complete search history.

(56) References Cited

U.S. PATENT DOCUMENTS

| | | | | |
|---|---|---|---|---|
| 2,712,743 | A | * | 7/1955 | Susemihl ...................... 66/1 R |
| 2,800,778 | A | * | 7/1957 | Susemihl ...................... 66/1 R |
| 3,237,844 | A | | 3/1966 | Hughes |
| 3,735,551 | A | | 5/1973 | Pratt |
| 3,834,185 | A | * | 9/1974 | Davenport ................... 66/1 R |
| 3,937,396 | A | | 2/1976 | Schneider |
| 4,110,956 | A | | 9/1978 | Weisberg |
| 4,631,905 | A | | 12/1986 | Maloney |
| 4,674,268 | A | | 6/1987 | Gavronsky et al. |
| 4,800,708 | A | | 1/1989 | Sperry |
| 4,854,109 | A | | 8/1989 | Pinarer et al. |
| 4,999,975 | A | | 3/1991 | Willder et al. |
| 5,027,583 | A | | 7/1991 | Chelak |
| 5,139,151 | A | | 8/1992 | Chelak |
| 5,335,483 | A | | 8/1994 | Gavronsky |
| 5,376,219 | A | | 12/1994 | Sperry |
| 5,516,221 | A | * | 5/1996 | Lake ......................... 83/425.3 |
| 5,679,208 | A | * | 10/1997 | Sperry et al. ................ 156/515 |

(Continued)

FOREIGN PATENT DOCUMENTS

WO    WO 2004/101252    11/2004

*Primary Examiner*—Louis K. Huynh
(74) *Attorney, Agent, or Firm*—Smith, Gambrell & Russell LLP

(57) ABSTRACT

A venting device with base and an adjuster supported by the base, and a driver driving the adjuster. The adjuster includes a film vent former moved by the driver between vent formation mode and non-vent formation mode. The adjuster includes an adjustable blade moving from non-vent mode position with the blade on a first side of the film to vent mode position with a segment of the blade positioned on an opposite film side. The blade has a blade segment traveling within a nip region of the film driver of a foam-in-bag dispenser, where the venting device is nestled in a film drive component slot in the nip zone, and an opposite nip zone roller across the film path has a reception groove receiving the blade segment. The blade is contained in a housing shaped to perform a film wrap around prevention function relative to the bag forming assembly.

26 Claims, 29 Drawing Sheets

U.S. PATENT DOCUMENTS

| | | | |
|---|---|---|---|
| 5,727,370 A * | 3/1998 | Sperry | 53/472 |
| 5,794,406 A | 8/1998 | Reichental | |
| 6,003,288 A * | 12/1999 | Sperry et al. | 53/551 |
| 6,131,375 A * | 10/2000 | Sperry | 53/472 |
| 6,234,777 B1 | 5/2001 | Sperry et al. | |
| 6,472,638 B1 | 10/2002 | Sperry et al. | |
| 7,160,096 B2 * | 1/2007 | Knaak et al. | 83/660 |
| 7,213,383 B2 | 5/2007 | Walker et al. | |

* cited by examiner

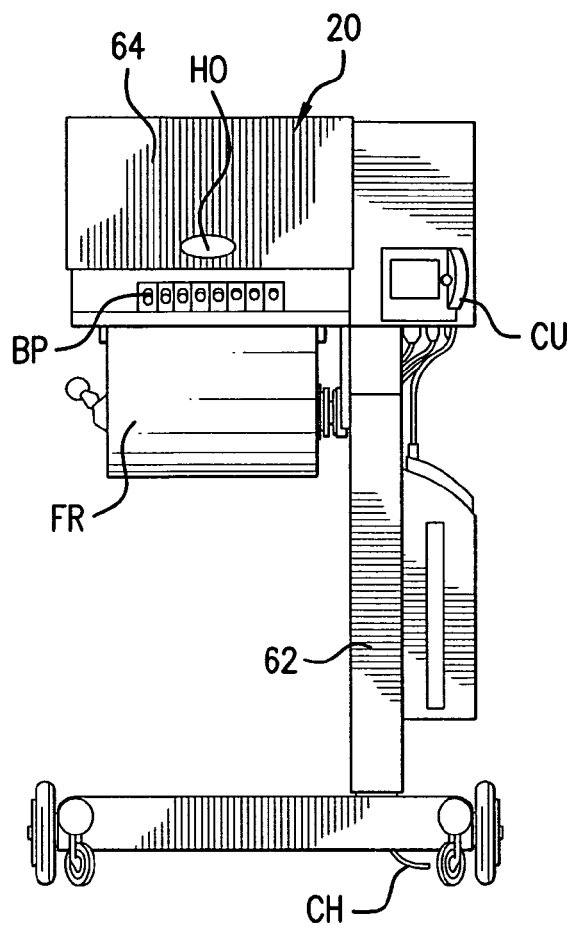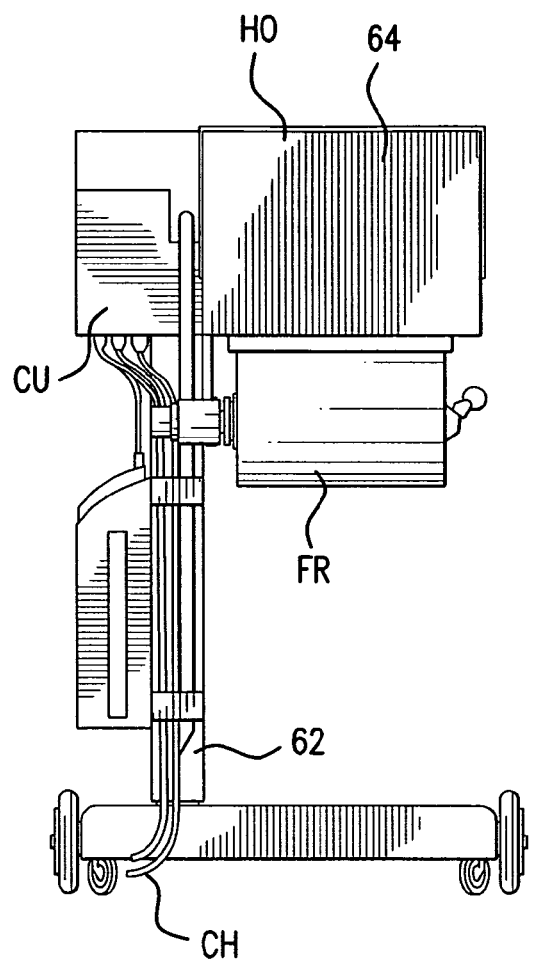
FIG.1　　　　　FIG.2
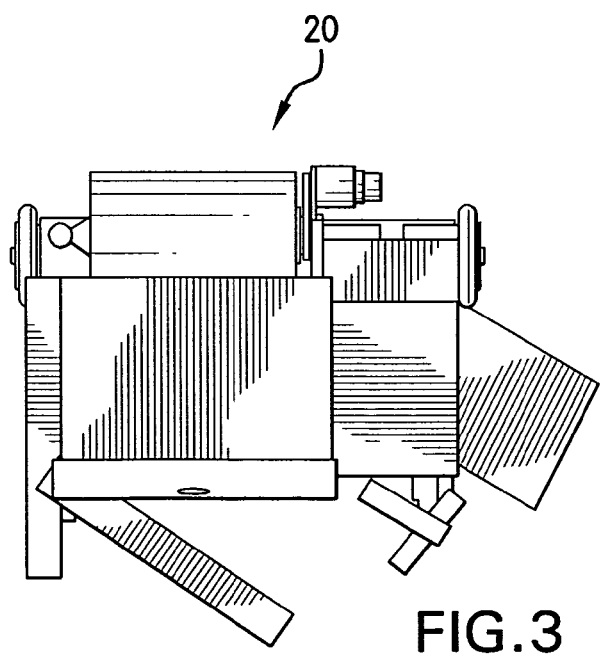
FIG.3

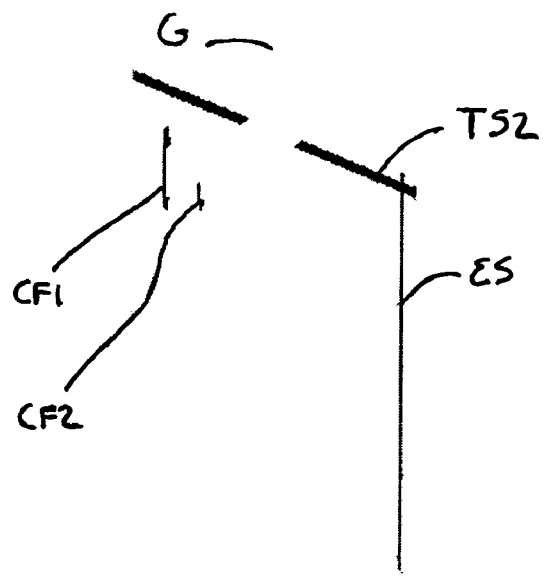
FIG. 22

VENTING SYSTEM FOR USE WITH A FOAM-IN BAG DISPENSING SYSTEM

CROSS REFERENCE TO RELATED APPLICATION(S)

Priority under 35 U.S.C. § 119(e) is claimed relative to Provisional Patent Application No. 60/644,523, filed Jan. 19, 2005, which is incorporated herein by reference.

FIELD OF THE INVENTION

The present invention is directed at a venting system for use with a foam-in-bag system such as one which forms a bag from a film feed source and, at the time of bag formation, receives from a dispenser a shot of foam precursor chemical mix. The foam precursor chemical mix expands and releases a gas within the bag formed or being formed with the venting system providing a gas release means in the bag.

BACKGROUND OF THE INVENTION

Over the years a variety of material dispensers have been developed including those directed at dispensing foamable material such as polyurethane foam which involves mixing certain chemicals together to form a polymeric product while at the same time generating gases such as carbon dioxide and water vapor. If those chemicals are selected so that they harden following the generation of the carbon dioxide and water vapor, they can be used to form "hardened" (e.g., a cushionable quality in a proper fully expanded state) polymer foams in which the mechanical foaming action is caused by the gaseous carbon dioxide and water vapor leaving the mixture.

In particular techniques, synthetic foams such as polyurethane foam are formed from liquid organic resins and polyisocyanates in a mixing chamber (e.g., a liquid form of isocyanate, which is often referenced in the industry as chemical "A", and a multi-component liquid blend called polyurethane resin, which is often referenced in the industry as chemical "B"). The mixture can be dispensed into a receptacle, such as a package or a foam-in-place bag (see e.g., U.S. Pat. Nos. 4,674,268, 4,800,708 and 4,854,109), where it reacts to form a polyurethane foam.

The above noted U.S. Pat. No. 4,800,708, which is incorporated herein by reference for background purposes, describes a method and apparatus for successively forming foam filled bags or cushions of the type wherein a foamable composition is deposited in a plastic bag. The formed bags are adapted to be placed in containers with articles being packaged, and so that when the foam expands, the bags and resulting foam are conformed to the configuration of the articles. The method and apparatus includes advancing a pair of plastic webs through the nip of a pair of drive rollers, while heat sealing the opposing longitudinal side edges of the webs together. Periodically, a predetermined amount of the foamable composition is deposited between the advancing webs immediately above the nip, and the heat sealing along the side edges is periodically and momentarily interrupted to form side edge openings for the subsequent escapement of gases generated during foaming. The advance of the webs is momentarily terminated, and a heated wire then engages the webs to sever the formed bag, while forming a sealed top edge of the formed bag and a sealed bottom edge for the next succeeding bag. The advance then again commences, and the cycle is repeated to successively form the foam filled bags.

As an example of a foam-in-bag dispensing system with a film feed for bag formation and chemical dispensing system reference is made to PCT/US2004/014423 filed on 7 May 2004 in the name of IntelliPack of Tulsa, Okla., US, and published in English as WO 2004/101252 A2, which PCT application is incorporated herein by reference. This reference uses a preferred "C-fold" film technique rather than the advanced webs from two different sources system utilized in U.S. Pat. No. 4,800,708.

U.S. Pat. No. 5,335,483 illustrates an additional foam-in-bag system featuring a C-fold film feed arrangement and with an adhesive strip seal formed on the free edges opposite the C-fold. As shown in FIG. 3 there is a blade device placed in contact with the C-fold film feed as it travels downstream from a guide bar. U.S. Pat. Nos. 4,854,109 and 4,999,975 illustrate additional foam-in-bag venting systems. An additional venting system is seen in U.S. Pat. No. 6,472,638 (see, for example, FIGS. 40 to 44) featuring a card inserts which include a vent formation heating wire Some difficulties experienced with the prior art venting designs include inadequate vent formation and the potential for foam shrinkage and poor in-bag foam flow within the bag due to inadequate venting or over extended vent formation and the associated leakage potential (e.g., a failure to properly control the required temperature differential to differentiate between a seal and vent region during interruption of an edge seal for venting purposes causing either too small or too large a seal interruption). The interruption technique (such as the feathering of the flow of electrical current to a sealing heat wire or the movement of heat sealing equipment into and out of position) also can introduce undesirable added complexities associated with temperature or equipment controlling particularly in an environment where devices can become coated with foam, worn out or moved in position during use (e.g., melting into a support component). An additional problem with some prior art is that cut venting is often done on only the front or the back sheet which limits the venting capability. There is also associated with prior art devices difficulty in repair and replacement for a defective venting component due to for example, difficulty in accessing or difficulty in removing and proper replacement.

SUMMARY OF THE INVENTION

The present invention is directed at providing a venting system that is particularly suited for a foam-in-bag dispensing system which helps avoid or lessen the effect of the numerous drawbacks associated with the prior art systems such as those described above. In so doing, the present invention presents a highly versatile system that provides numerous advantageous features without invoking added complexity and added components, which is a common tendency in the prior art systems, particularly of late.

A preferred embodiment of the invention features a venting device that can be easily utilized in conjunction with a bag forming system such as those described above with a preferred embodiment being a blade venting device that can easily be retrofitted on existing machines as in one that is dual functioning as a film guide cane when not in vent formation mode and thus used as a replacement of a preexisting non-dual functioning guide cane. In a preferred embodiment, there is utilized multiple venting devices in an overall venting system which utilizes a pair of cane replacement mounted blade venting devices as in a pair positioned within the intermediate area of one of a pair of common shaft rollers used to nip the film being fed to a roller set, with a preferred arrangement being one with a C-fold film feed and the roller associated with the venting devices being the one in contact with the C-fold side of the film. For example, in a preferred embodiment the cane closest to the C-fold is replaced together with the cane closest thereto with a venting device.

The present invention further includes alternate arrangements as in venting devices which utilize an alternate vent formation means as in a heat source (e.g., electric resistance or high energy light, etc), although a blade device is preferred as it avoids added complexity and is low cost and easy to replace. Alternate combinations include, for example, heated blades or a combination of positioning of the venting devices (e.g., replacing different cane locations including venting within an inch or two of opposite edges of the film), although the noted "C-fold" only side positioning provides for vent formation relative to a known condition edge (unlike the alternate side which may have a defect during seal formation). Additional alternate arrangement under the present invention include a combination of blade venting with edge seal interruption (e.g., a blade vent assembly used in conjunction with a system such as the intermittent labyrinth side seam in U.S. Pat. No. 4,999,975 or one of the other interrupted side seam vent arrangements described above) or in conjunction with a small hole (e.g., spike formed vented film sheet as seen in U.S. Pat. No. 5,794,406). Again, however for the avoidance of complexity and added repair and film feed disruption potential the vent systems described in greater detail below as preferred embodiments are preferable for most vent need environments.

Some of the features of a preferred embodiment include a blade venting device with a blade mounted inside of its own customized blade housing. A function of the noted blade housing is to provide protection for personnel who handle the blade during installation or service, and the blade housing can be made of metal or plastic. In a dual blade venting system (preferably two separate housings although an integrated system with a single housing and multiple blades is also featured under the present invention) two blade cartridges are mounted in close proximity to the nip zone between two film drive rollers. For example, a preferred system features blade cartridges that are supported by the cane support rod that is located above the nip rollers and runs across the front of many machines in the field (although alternate locations are also featured under the present invention as in roller shaft supported locations such as a similar slide and non-rotation arrangement as featured for the edge sealer in the above noted PCT/US2004/014423) with a dual function guide cane/blade housing arrangement, one blade cartridge is located in the cane slot on the right side of the rubber nip roller, while another blade cartridge is located in the cane slot on the left side of the same rubber nip roller (again preferably the one in contact with the C-fold side). In this way, the blade cartridges will perform and anti-wraparound function of the current film canes, upon the canes being replaced by the blade cartridges (in a retrofit situation) or put in what would have been that position in a new machine manufacture.

In a preferred embodiment, the blade cartridges are held in position by mounting blocks that are attached to the existing cane support rod with simple fasteners, like set screws for example or, more preferably, in a tooless fashion using the film forming structure as position stabilizers. For example, one mounting block can be used for the left hand blade cartridge, and another for the right hand blade cartridge. The blade cartridges can thus be installed and detached easily from their respective mounting blocks. To adjust the blade between a vent formation mode and no-vent formation mode, a blade manipulation device is featured. A preferred blade manipulation system features a pivoting blade device with a position adjuster. In a preferred embodiment this involves an elongated blade with a bag slicing end and an intermediate pivot location within the housing and a manipulating device (driver) contact section at, for instance, an opposite end of the blade or as some alternate location that provides for pivot action between the vent mode and non-vent mode (e.g., rotating key shaft at pivot region or between pivot point and vent formation film contact end). The manipulator device can feature a plurality of manipulation means as in cam device, a push rod, an inflation device or, a rotation solenoid, etc. The rotary solenoid and associated mechanism (e.g., eccentric roller) to drive the blade within each cartridge is contained within and/or supported on the aforementioned mounting block. In the dual vent formation embodiment, each blade is actuated by its own rotary solenoid driven mechanism which propels the blade into slitting position, and then retracts the blade back to home at the end of the cycle (e.g., a rotation through or a rotation back to non-vent mode). There is also featured under the invention return or engage facilitators such as a spring to return a blade to a home position in rapid fashion.

In a preferred embodiment a control systems CPU controls each solenoid with wires that run from the control board inside the main electrical enclosure and either blade can be actuated independently of the other. In this regard, reference is made to PCT application PCT/US2004/014516 filed on 10 May 2004 in the name of IntelliPack of Tulsa, Okla., US, and published in English as PCT Publication No. WO 2004/102294 A2, which application is incorporated herein by reference.

The blades extend from their respective cartridges upon command by the foam-in-bag control system to make slit vents in the bag. In a preferred embodiment, the blade rotates only slightly about a pivot point located on the top end of its support cartridge. The rotational stroke on each blade will be about 3 degrees from home position—into the film path. As the tip of the blade crosses the nip zone—it punctures both film webs. When the blades are fully extended into the nip zone—they slit the film web that is being pulled through the nip zone by the rotation of the nip rolls. When the blades are retracted back to their home position—the film will pass through the nip zone without venting.

In a preferred embodiment the blade is designed to extend into a circular groove formed in the opposing roller (e.g., the non-rubber, aluminum nip roller that is not in contact with the canes). To avoid having the film ride into a recess, there is preferably provided a cuttable insert as in a silicone ring that presents a flush nip surface relative to the supporting nip roller main body. Also, there is preferably provided a mounting base which supports both the blade cartridge and its driver system. For example, in a preferred embodiment the mounting base is releasably secured to another component of the film feed system as in the frame structure supporting the rollers (e.g., a U-shaped frame structure with rollers extending between opposing legs) and the back wall providing a securement location (e.g., an over center latch gripper that provides for clamping of the mount base in location or a tooless configuration relying on a friction fit between the back wall and cane rod). The mount base preferably pivotably or slideably supports the rotation solenoid or other driver that is used to enable rotation out of the way and a release of the blade cartridge (e.g., slideout of a recess with spring biased catch or a flange capture arrangement) as well as repositioning of the entire vent assembly along the film width.

In a preferred embodiment the bag is vented by slitting four openings through each bag with the front face of the bag having two slits—one preferably near the top left corner of the bag—and one further to the right as in the top right corner of the entire bag or one or more cane locations over toward the left side. Similarly, the rear face of the bag will have two slits corresponding to the sister slit in the front produced by the same blade. The length of each slit can be controlled with the solenoid activation controller. Preferably the slits on the font and rear bag faces, produced by a common blade, have equal length. The slits produced by the respective blades can be made of different length by way of controlling the blade drivers (e.g., rotation solenoid individually). Under most uses, the limit on the maximum slit length is the length of the bag and the possibility of foam and/or solvent leakage when the slits are formed too long. On the other hand, the limit on the minimum slit length is determined by the speed and size of the knife blade in relation to the speed of film feed when the knife is actuated. Moreover, the position of the vent openings along the longitudinal axis (machine direction) of the bag can be controlled and adjusted to fit the application. For example, the slit vents can be made in any position along the length of the bag and the vents on the left side of the bag do not have to be in the same longitudinal position as the vents(s) to the right side of the first vent. In addition, multiple sets of vents can be made on either or both sides of the bag. For example, the right side of the bag can have one set of vents—while the left side of the bag has two or more sets. Since the lateral position (transverse direction) of each knife is preferably fixed by the way they are mounted to the cane support bar, the lateral position of the vent slits on the bag will be fixed on all bags. That is, for simplicity, there is preferably no provision for on-the-fly adjustment of the lateral position of the vent slits. In this way once the venting modules (base mount assembly with supported blade cartridge and driver) are installed, they can remain in one spot for different bag runs or different bag shapes and sizes. With the standard 19 inch bag width, a first set of vents is located about two inches inboard from the C-fold side edge of the bag and the second one further inboard about the same distance (e.g., to the next cane). An alternate embodiment places a vent about 2 inches inward on each edge. In this way there is a provision for installing the venting modules closer together for a 12-inch wide bag option or farther apart for large bags.

To accommodate for different size bags the venting modules are either adjustably supported or positioned at a location which is universal to different sizes as is the adjacent cane embodiment. For example, in one embodiment the mounting base includes a releasable clamp assembly as in an over-center latch preferably with a high friction block for contact with the roller support frame back wall that can be readily repositioned along the frame backwall and clamped back into position (again preferably by at a cane replacement location). Thus, with the preferred embodiment of the invention there is an improved venting which reduces the possibility of foam shrinkage and minimize restrictions to foam flow and distribution within the bag. Also the described double blade venting system is easily retrofittable onto any existing foam-in-bag in the field. Also, the control system to operate the venting knives is relatively easy to implement requiring for most preferred usages simply on/off control of solenoid actuators. Accordingly, there can be avoided relatively complex control system, such as those required to "feather" the flow of electrical current through an electrical cut wire. In addition, partially with a pivot out mount base driver support and releasable cartridge (e.g., a spring or friction lever latch with capture recess assembly as in common with many printer cartridges) the blade holding cartridges will be easy to replace should their blades get dull or damaged. Also, the venting blades are not exposed for undesirable contact to personnel, and are safe to handle during installation and shipping.

BRIEF DESCRIPTION OF THE DRAWINGS

FIG. 1 shows a front elevational view of a foam-in-bag dispensing system.

FIG. 2 shows a rear elevational view of the foam-in-bag dispensing system.

FIG. 3 shows a top plan view of the foam-in-bag dispensing system.

FIG. 13B shows a different perspective angle of that which is shown in FIG. 13A and with the opposing roller added in.

FIG. 22 shows the bag of FIG. 21 in a perspective view.

DETAILED DESCRIPTION OF THE PREFERRED EMBODIMENTS

Figure 4:
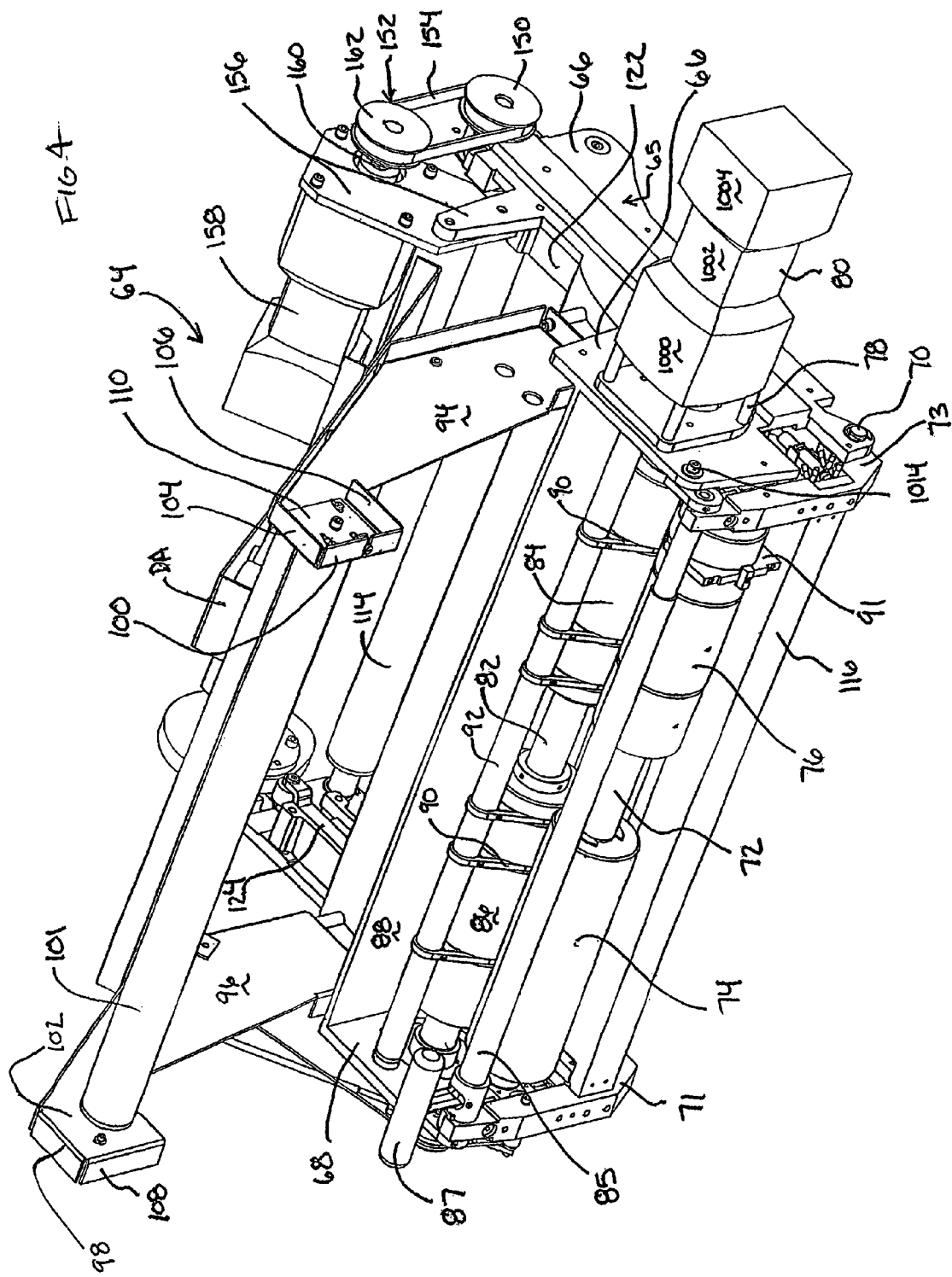
FIG. 4 shows a front perspective view of the bag forming assembly of the system in FIG. 1.

The venting system of the present invention can be utilized in a variety of bag formation with vent requirement systems such as the foam-in-bag venting system of the above noted PCT Patent Application PCT/US2004/014423 (e.g., as part of a retrofit process or in conjunction with an initial manufacture of a foam-in-bag system). FIGS. 1 to 3 illustrate the foam-in-bag dispensing system 20 described in PCT/US2004/014423 which represents one of many possible foam-in-bag systems suitable for use with the venting system of the present invention to provide an improved foam-in-bag system. As shown in FIGS. 1-3 the foam-in-bag dispensing system 20 is in communication with a chemical supply (not shown) which typically involves a first chemical supply line from a container source (supplying chemical component A) and a second chemical supply line from a container source (supplying chemical component B) via respective heated chemical hoses CH which feed into a manifold port 198 of the dispenser 192 shown in FIG. 6 having a dispenser mixing chamber with outlet port within mixing chamber housing 196 that is designed to feed the mixed chemical into a bag being formed.

FIGS. 1-3 further illustrate a film roll support assembly FR within which a suitable roll of bag formation material 216 (FIG. 7) is provided (the illustrated embodiment featuring a preferred C-fold film supply although other film source techniques are also featured under the present invention such as a single roll dual layered film supply or a two roll supply assembly or a tube film supply, etc). FIG. 1 further illustrates the control unit for controlling various activities which preferably is the location for the driver logic associated with the venting system described below. The incorporated herein by reference PCT/US2004/014516 illustrates a suitable control system into which can be modified to include the appropriate logic control to accommodate the below described vent formation (e.g., added software and/or hardware and/or sensing systems to activate and deactivate the below described vent system). This preferably includes an appropriate operator command/adjustment mechanism as in a touch pad control screen in the control unit CU and/or a dedicated adjustment button on, for example, button panel BP in FIG. 1 for each utilized venting device of the venting system (e.g., vent length control, etc.).

Figure 5:
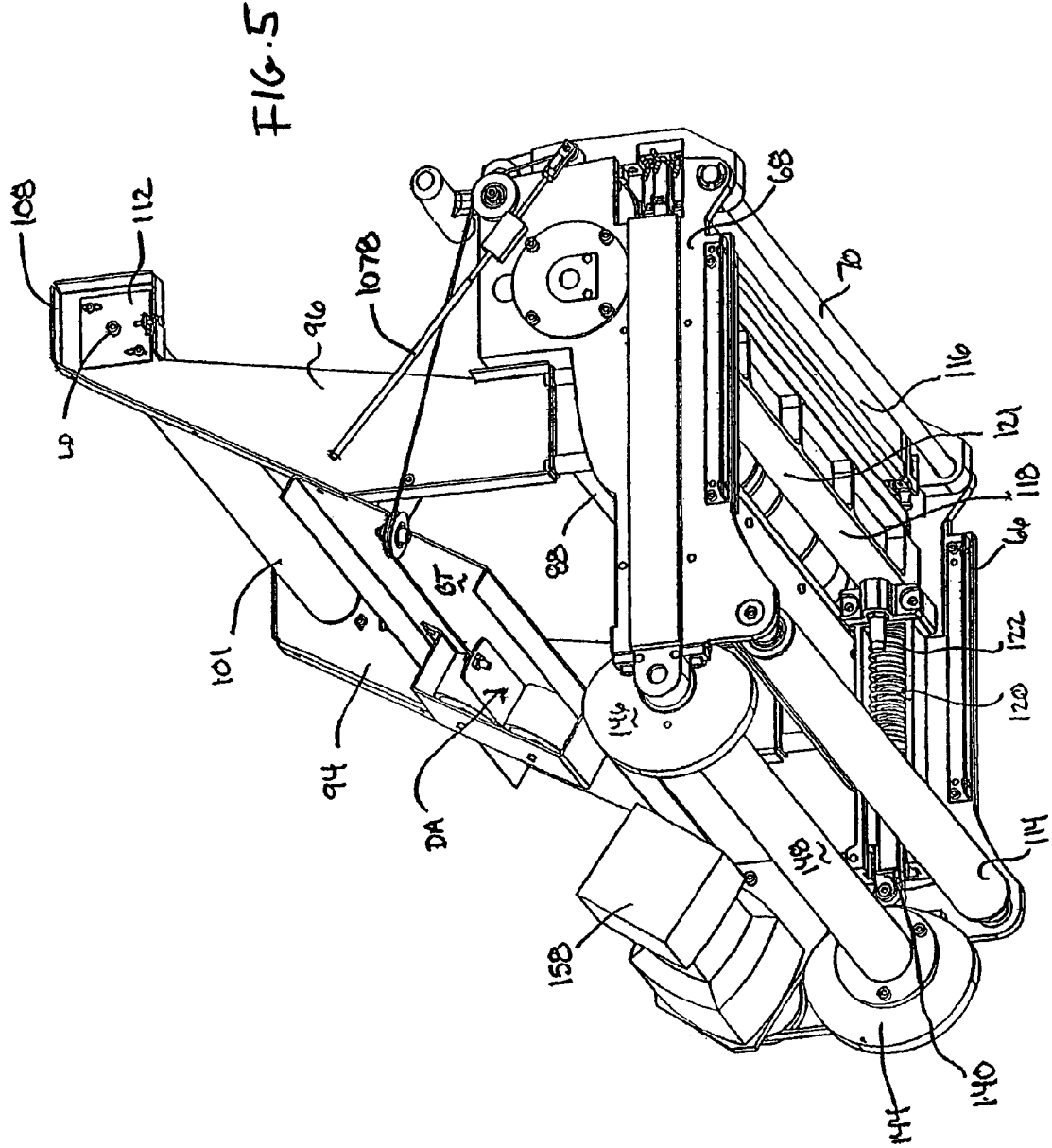
FIG. 5 shows a rear perspective view of the bag forming assembly.
Figure 6:
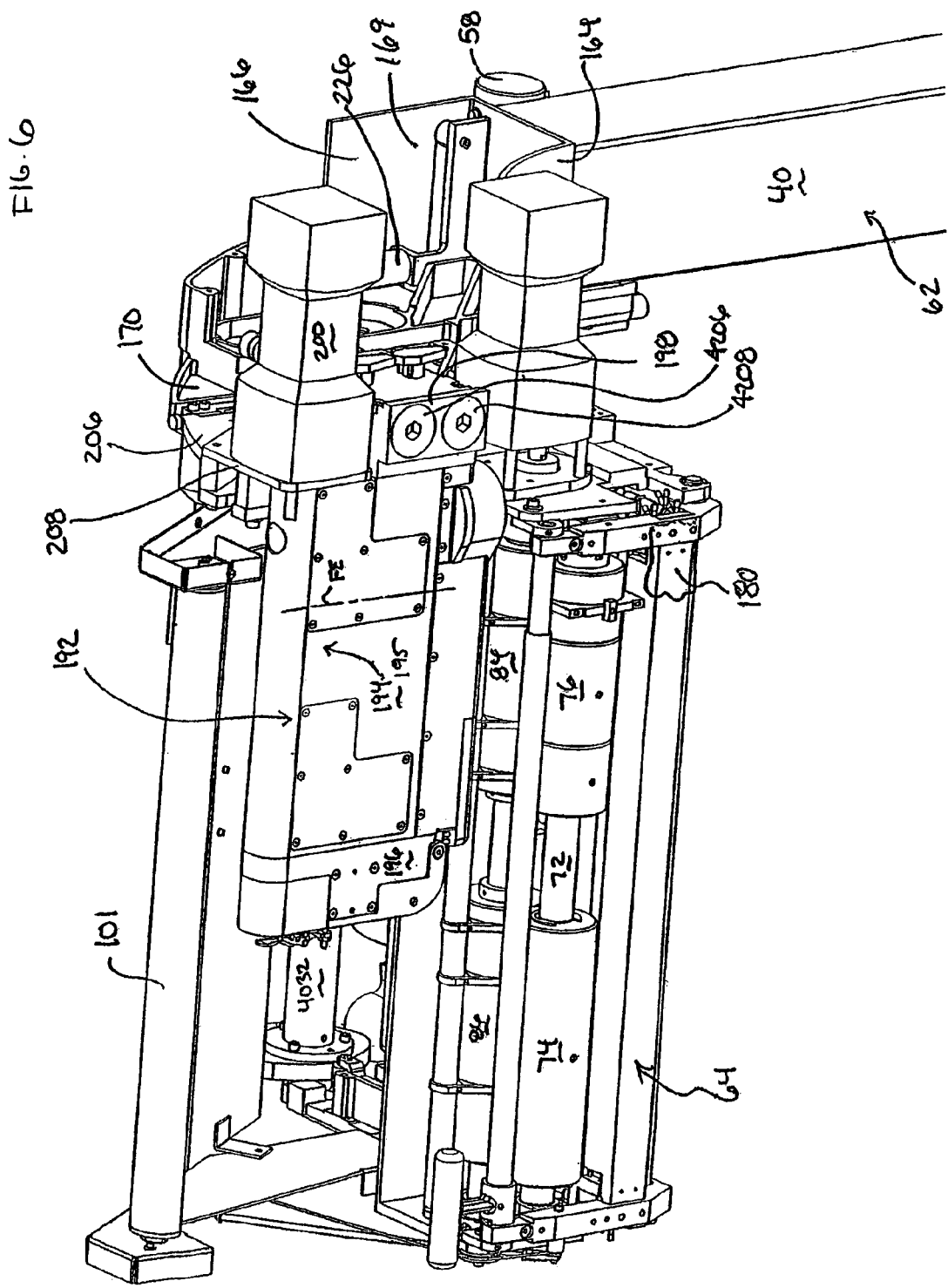
FIG. 6 shows a front perspective view of the bag forming assembly with dispenser attached for dispensing into a bag being formed.

FIGS. 4-6 shows bag forming assembly 64 mounted in cantilever fashion on support mount or bracket 62 as shown in FIGS. 1 and 2. Bagger assembly 64 comprises framework 65 having first side frame 66 (shown on the right side relative to a front view in FIG. 4) and second side frame 68 (shown on the left side in the front view FIG. 4). Side frame 66 has means for mounting bagger assembly 64 to support bracket 62 (e.g., a set of bolts). Framework 65 further includes front pivot rod 70 extending between the two interior sides of side frames 66, and 68, as well as front face pivot frame sections 71 and 73 which are pivotally supported by pivot rod 70. Rod 70 also extends through the lower end of front face pivot frame sections 71 and 73 to provide a rotation support for sections 71, 73. Driver roller shaft 72, supporting left and right driven or follower nip rollers 74 and 76, also extends between and is supported by side frames 66 and 68. While in a latched state the upper ends of pivot frame sections 71, 73 are also supported (locked in closed position) by door latch rod 85 with handle latch 87.

First frame structure 66 further includes mounting means 78 for roller shaft drive motor 80 in driving engagement with drive shaft 82 extending between and supported by frame structures 66 and 68. Drive shaft 82 supports drive nip rollers 84 and 86. Framework 65 further comprises back frame structure 88 preferably formed as a single piece unit with side frame structures 66 and 68. Driven roller shaft 72 and driver roller shaft 82 are in parallel relationship and spaced apart so as to place the driven nip rollers 74, 76, and drive nip rollers 84, 86 in a film drive relationship with a preferred embodiment featuring a motor driven drive roller set 84, 86 formed of a compressible, high friction material such as an elastomeric material (e.g., synthetic rubber) and the opposite, driven roller 74, 76 is preferably formed of a knurled aluminum nip roller set (although alternate arrangement are also featured as in both sets being formed of a compressible material like rubber). The roller sets are preferably placed in a state of compressive contact by way of the relative diameters of the nip rollers and rotation axis spacing of shafts 72, and 82 when pivot frame sections 71, 73 are in their roller drive operation state. FIG. 4 further illustrates door latch rod 85 rotatably supported at its opposite ends by pivot frame sections 71, 73 and having door latch (with handle) 87 fixedly secured to the left end of door latch rod 85. Latch 87 provides for the pivoting open of pivot frame sections 71, 73 of the hinged access door means about pivot rod 70 into an opened access mode (including improved access to the below described venting system). While in a latched state, the upper ends of pivot frame sections 71, 73 are also supported (locked in closed position) by door latch rod 85.

Drive nip rollers 84 and 86 have slots formed for receiving film pinch preventing means 90 (e.g., canes 90) that extend around support rod 92 with rod 92 extending between first and second frames 66, 68 and parallel to the rotation axes of shafts 72 and 82 (as well as blade vent cartridges which, as explained below, preferably function as well as film pinch prevention means). FIG. 4 further illustrates bag film edge sealer 91 shown received within a slot in roller 76 and positioned to provide edge sealing to a preferred C-fold film supply. FIG. 21 illustrates the resultant edge seal produced by edge sealer 91 which is shown as a continuous edge seal in the "C-fold" film based bag BA. In the above noted PCT/US2004/014423 venting preferably takes place on the side with the edge seal ES through a temporary lowering of heat below the sealing temperature as the film is fed past. While this venting technique can be utilized in the present invention, it is preferably replaced or supplemented with an alternate venting system embodiment as in blade venting system VS shown in FIGS. 13-20 of the present application.

To facilitate film feed through the system and proper bag orientation to provide for accurate formation of the edge and transverse sealing, rear frame structure 88 has secured to its rear surface, at opposite ends, idler roller supports 94 and 96 extending up (e.g., 8 to 15 inches or a preferred 11 inches) from the nip roller contact location. Idler roller supports 94, 96 include upper ends 98 and 100 each having means for receiving a respective end of upper idler roller 101 (e.g., a roller shaft reception aperture or bearing support). As shown in FIG. 4, ends 98, 100 present opposing parallel face walls 102, 104 and outward flanges 106, 108. Within the confines of flanges 106, and 108 there is provided first and second idler roller adjustment mechanisms 110, and 112. In a preferred embodiment, one of the adjustment mechanisms provides vertical adjustment as to the rotation axis of idler roller 101 while the other provides front to back horizontal adjustment to the same idler roller 101 rotation axis. FIG. 5 illustrates the horizontal track adjustment means of the present invention which, in combination with the opposite vertical adjustment track plate, helps ensure the film properly tracks through the nip roller (retains a right angle film edge relationship to the roller axis while traveling a pre-set preferably generally centered or intermediate path through the nip roller set with "FE" in FIG. 6 illustrating the preferred non-fold side edge of the C-fold film). Also, idler roller 101 is preferably a steel or metal roller and not a plastic roller to avoid static charge build up relative to the preferred plastic film supplied. Idler roller is also preferably of the type having roller bearings positioned at its ends (FIG. 7) for smooth performance and smooth, unwrinkled film feed.

Figure 7:
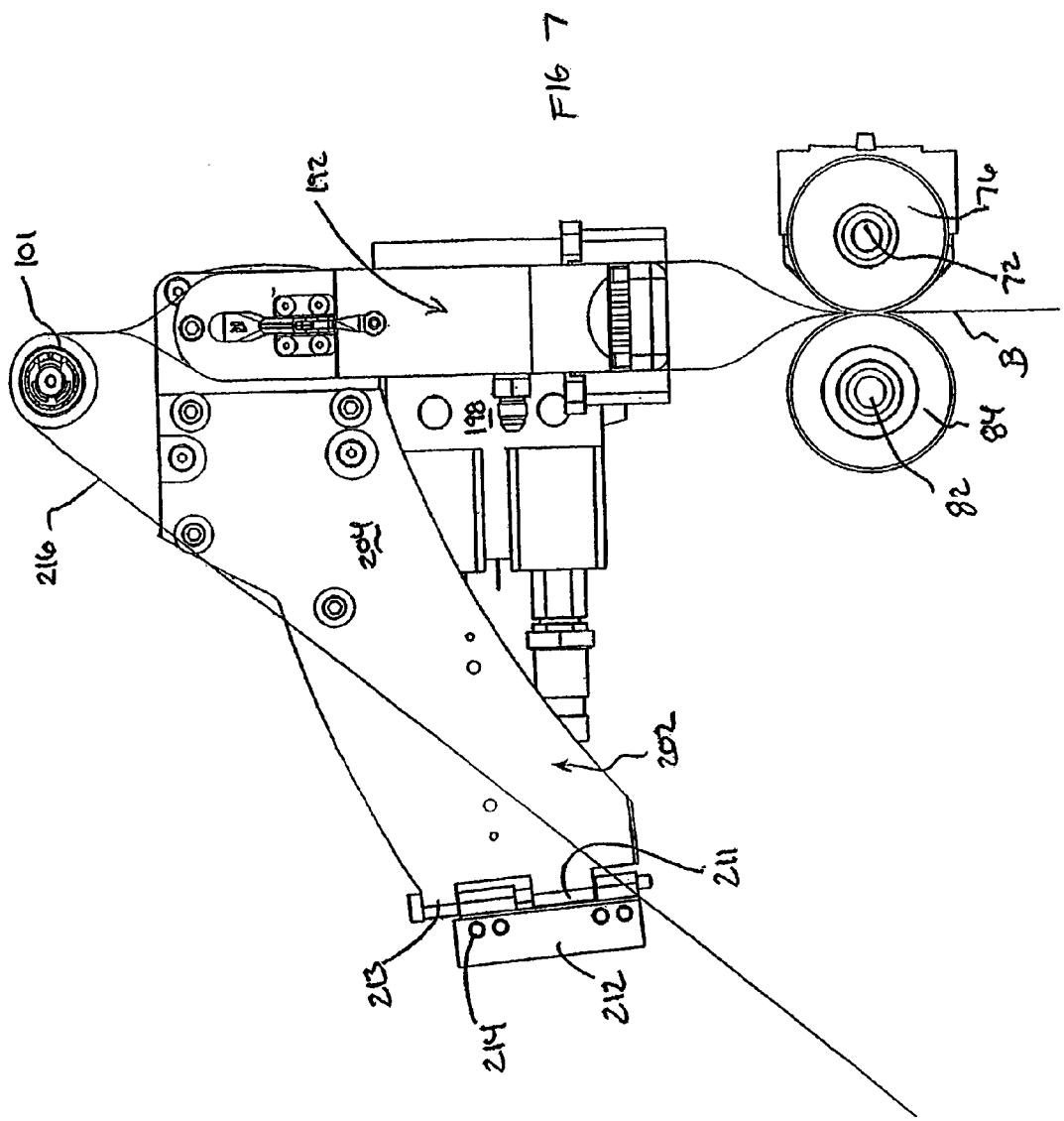
FIG. 7 shows film feed through the bag forming assembly and about the mounted dispenser.

With reference particularly to FIGS. 4 and 5, second or lower idler roller 114 is shown arranged parallel to drive roller shaft 82 and supported between left and right side frames 66 and 68. Idler roller 114 preferably has a common roller/bearing design with that of idler roller 101. Also, these figures show first (preferably fixed in position when locked in its operative position) end or cross-cut seal support block or jaw 116 positioned forward of a vertical plane passing through the nip roller contact location and below the axis of rotation of drive shaft 82. End seal jaw 116, which preferably is operationally fixed in position, is shown having a solid block base of a high strength (not easily deformed over an extended length) material that is of sufficient heat wire heat resistance (e.g., a steel block with a zinc and/or chrome exterior plating), and extends between left and right frame structures 66, and 68, but again, like driven shaft 72 and rollers 74, 76, is preferably supported on pivot frame sections 71, 73 and extends parallel with driven shaft 72. FIG. 7 illustrates block 116 rigidly fixed at its ends to the opposing, interior sides of pivot frame sections 71, and 73 for movement therewith when latch 87 is released.

Movable end film sealer and cutter jaw 118 (FIG. 5) is secured to end sealer shifting assembly 120 and is positioned adjacent fixed jaw 116 with fixed jaw 116 having sealer and cutter electrical supply means 119 with associated electric connections supported on the opposite ends of jaw 116 positioned closest to the front or closest to the operator. End sealer shifting assembly 120 is positioned rearward and preferably at a common central axis height level relative to end seal contact block 116. During formation of a bag, heater jaw 116 supports a cutter heater wire in-between above and below positioned seal forming wires (e.g., for a total of three vertically spaced apart heater wires designated SE1,CE and SE2 in FIG. 8) with of, for example ⅛ to ¾ inch equal spacing with ¼ to ½ inch spacing being well suited for providing the seal (SE1) cut (CT) seal (SE2) sequence in the bag just formed and the bag in the process of being formed. FIG. 21 illustrates bag BA with transverse seals TS1 (first formed) and TS2 (second formed) following formation of the SE-CT-SE sequence and subsequent to the separation at the cut of an earlier formed bag and a currently being formed bag. With the SE-CT-SE arrangement there is provided a more assured bottom bag formation and there is avoided the problems associated with prior art devices that rely on the end or cross-cut only as the means for sealing. For example, if for any reason a perfect end seal is not secured during the cut formation, there can result massive foam spillage and build up as the foam mix is at its most liquid and least foam development stage when the dispenser first shoots the shot into the just formed bag bottom. However, the venting system of the present invention is useable as well in a bag forming system relying on a single wire induced seal and cut or any other transverse seal formation mechanism.

A preferred embodiment features a combination end film sealer means and cutter means 119 having three independently controlled cross-cut/cross-seal resistance wire mechanisms preferably extending across the full length of the face of block 116. These wires are connected at their ends with quick release wire end holders. The end seal and cutter means on the fixed block 116 (after access panel locked in place) works in conjunction with movable sealer shifting assembly or jaw support assembly 120 shown in FIGS. 5, 8 and 9. The heater and sealer wires are sensed and thus in communication with a controller such as one associated with a main processor or a dedicated heater wire monitoring sub-processor of the control unit CU.

Figure 8:
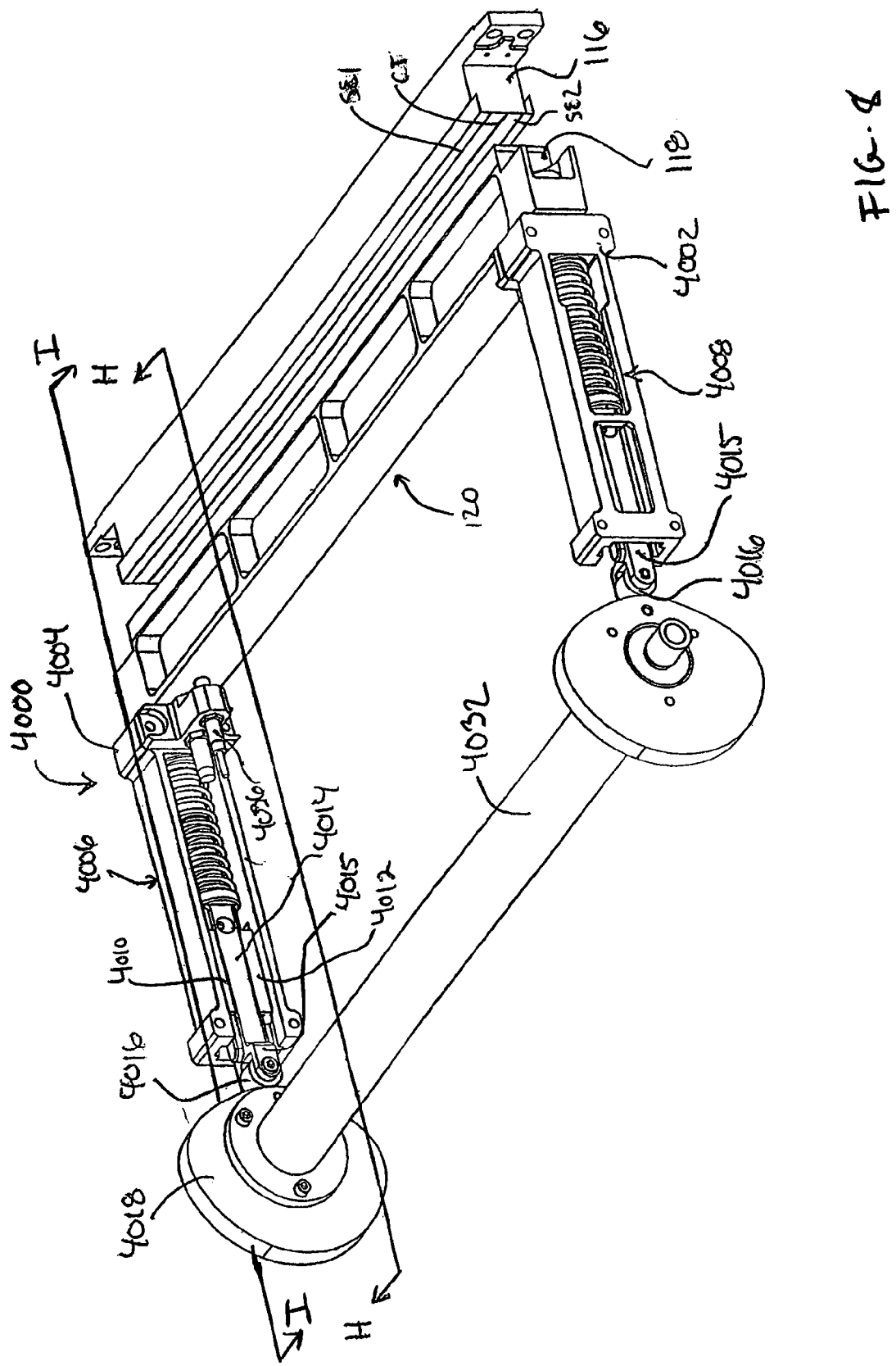
FIG. 8 shows the transverse seal forming device in a retracted state.
Figure 9:
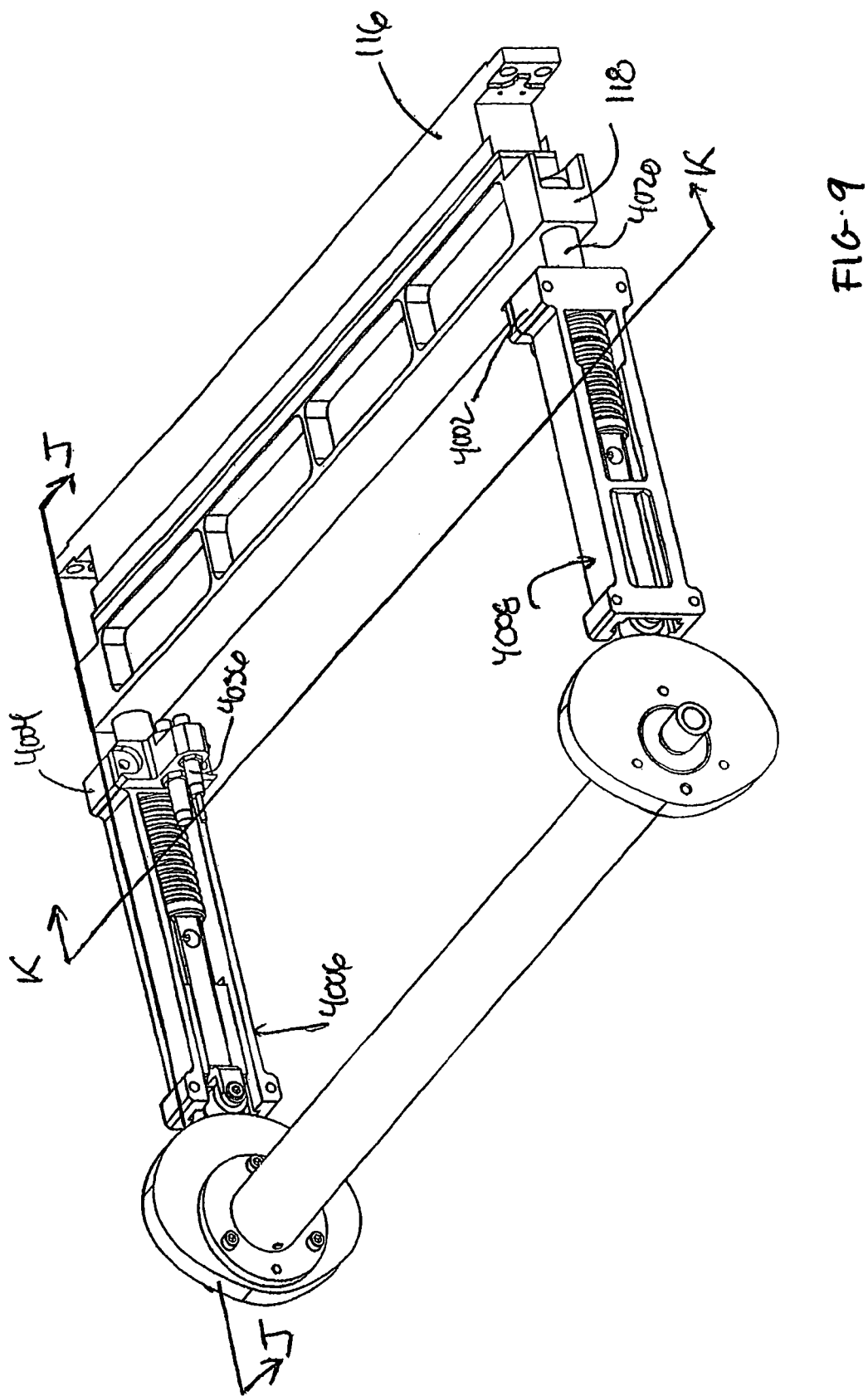
FIG. 9 shows the transverse seal forming device in a sealing state.

Block 118 also has a forward face positioned rearward (farther away from operator) of the above mentioned nip roller vertical plane when in a stand-by state and is moved into an end seal location when shifting assembly is activated and, in this way, there is provided room for bag film feed past until end sealer shifting assembly 120 is activated. FIGS. 8 and 9 show a perspective view of an embodiment of a moving jaw assembly 4000 which retracts and pushes forward jaw block 118 against the preferably stationary jaw 116 with heated cross cut and seal wires. The rear end of block 118 is connected at opposite ends to respective casings 4002 and 4004 with these casings forming a part of the cam force transmission devices 4006 and 4008. Cam force transmission devices 4006 and 4008 are the same except for their mirror image positioning (and below described home positioner) and thus the discussion focuses on transmission device 4006 alone. Casing 4004 is secured to frame structure 66 of bagger assembly 64 at its expanded ends and has an interior reception chamber formed along its inner side. As seen from FIG. 9, within this chamber is positioned bearing plates 4010 and 4012 which receive in sliding fashion cam rod 4014. The rear end of cam rod 4014 includes cam yoke 4015 which supports cam roller 4016 which rides along cam 4018 having a eccentric shape with a minimum contact thickness shown in contact with roller 4016 in FIG. 8 and a maximum thickness shown in contact with roller 4016 in FIG. 9.

The forward end of cam rod 4014 includes a threaded center hole receiving push rod 4020 having a first end extending into threaded contact with the center hole and a second end that extends through an aperture in block 118 and has enlarged head 4022. Push rod 4020 is encircled by rod sleeve 4024 having a forward end received with a pocket recess in block 118 and a rearward end in contact with first (inner) biasing member 4026, which is preferably a coil spring, compressed between a forward end of push rod 4014 and a rear end of sleeve 4024. Surrounding inner spring 4026 is a second (outer) biasing member 4028, also preferably in the form of a coil spring, received by a flanged end of cam follower 4014 at one end and in contact with an outer flanged sleeve 4030 in contact with the forward enlarged end of casing 4004. Outer spring 4028 is designed to hold the cam follower or cam rod 4014 against the cam, while the inner spring 4026 produces the compression for sealing the jaws at the time of forward extension. In view of these different functions, outer longer spring (e.g., 3.5 inch free length) preferably has a much lower spring constant (e.g., 12 lbs/in) as compared to the inner shorter spring (e.g., 1.75 inch free length) having a higher spring constant (e.g., 750 lbs/in). Cams 4018 and 4018' are interconnected by cylindrical drive sleeve 4032 with annular flanges 4034 and associated fasteners providing a means of securement between the sleeve 4032 and a respective eccentric cam, with the cams being driven by cam motor 158 and associated drive transmission as in the other embodiment.

FIG. 9 illustrates home sensor 4036 which is connected to an extension of casing 4004 and is positioned for monitoring the exact location of the moving jaw 118 at all times and is in communication with the control and monitoring subsystem of control unit CU and provides position feedback which is useful, together with the encoder information generated by the cam motor 158 in determining current and historic location data.

FIG. 7 provides a side elevational view of dispenser system 192 and bracket assembly 202 in relationship to film 216 which in a preferred embodiment is a C-fold film featuring a common fold edge and two free edges at the opposite end of the two fold panel. While a C-fold film is a preferred film choice, a variety of other film types of film or bag material sources are suitable for use of the present invention including gusseted and non-gusseted film, tubular film (preferably with an upstream slit formation means (not shown) for passage past the dispenser) or two separate or independent film sources (in which case an opposite film roll and film path is added together with an added side edge sealer) or a single film roll comprised of two layers with opposite free edges in a stacked and rolled relationship (also requiring a two side edge seal not needed with the preferred C-fold film usage wherein only the non-fold film edging needs to be edge sealed). For example, in a preferred embodiment, in addition to the single fold C-fold film, with planar front and back surfaces, a larger volume bag is provided with the same left to right edge film travel width (e.g., 12 or 19 inch) and features a gusseted film such as one having a common fold edge and a V-fold provided at that fold end and on the other, interior side, free edges for both the front and rear film sheets sharing the common fold line. The interior edges each have a V-fold that is preferably less than a third of the overall width of the sheet (e.g., 2½ inch gussets) and the below described venting system VS can either avoid contact with the folded gusseted insert or slice through the gusseted fold extension to increase the number of vent holes formed.

As shown in FIG. 7 after leaving the film roll and traveling past lower idler roller 114, the film is wrapped around upper idler roller 101 and exits at a position where it is shown to have a preferred vertical film departure tangent vertically aligned with the nip contact edge of the nip roller sets. Because of the C-fold arrangement, the folded edge is free to travel outward of the cantilever supported dispenser system 192. That is, depending upon film width desired, the folded end of C-fold film 216 travels vertically down to the left side of dispenser end section 196 for driving nip engagement with the contacting, left set of nip rollers (74, 86). As further shown in FIG. 7 the opposite end of film 216 with free edges travels along the smooth surface of dispenser housing whereupon the free edges are brought together for driving engagement relative to contacting right nip roller set (76, 84) whereupon the contacting free film edges are subject to edge sealer 91 to complete the side edge sealing for the bag being formed.

Figure 10:
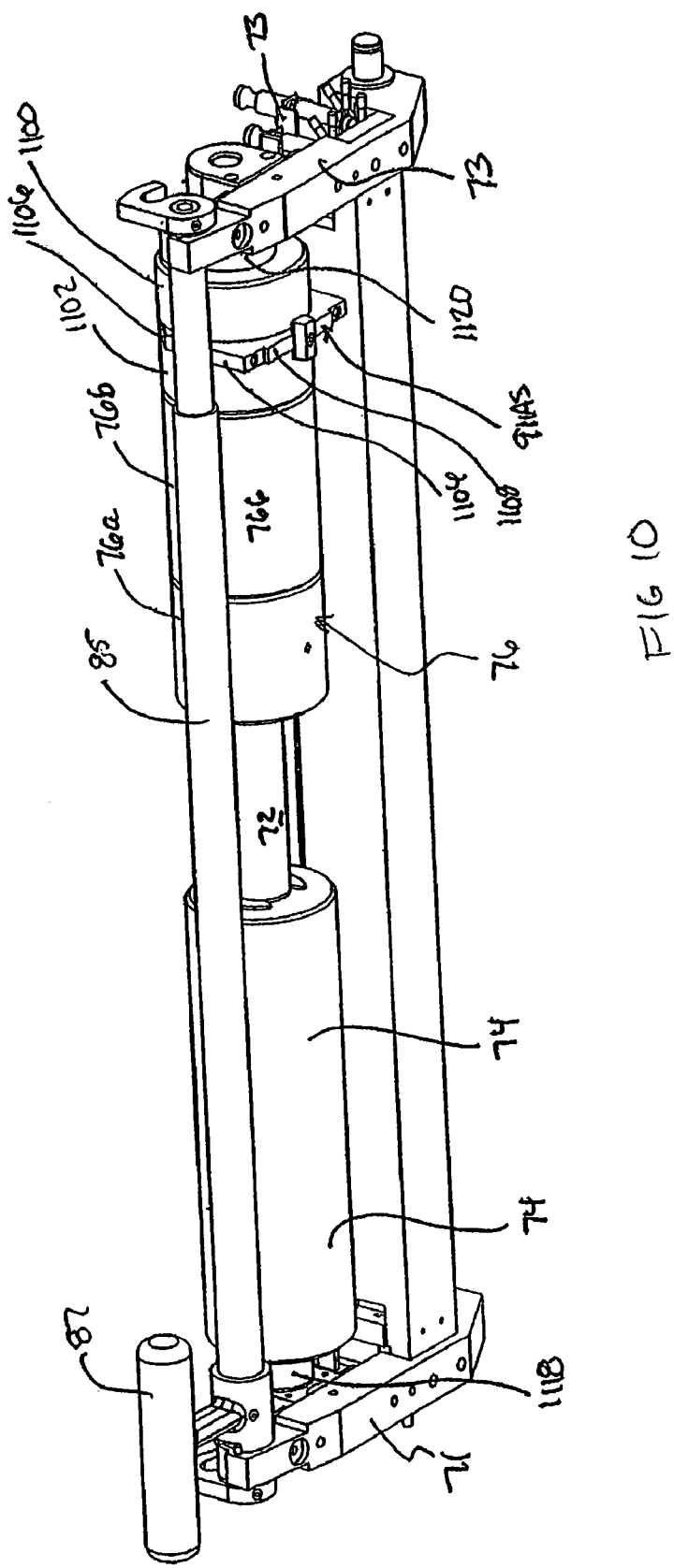
FIG. 10 shows one of the nip rollers supporting an edge seal assembly.

FIG. 10 illustrates the front door panel (the paneling shown in FIG. 1 being removed showing the framework only which includes components 71,73 and intermediate cross bar 116) together with door movement limitation means or door stop 1078. The hinged access door is precluded door stop from rotating freely down into contact with fixed frame structure of the bagger assembly. Additional damping means DA is preferably also provided as illustrated in An advantage provided by hinged access door is the ease in which the film can be threaded through the nip rolls (or released as, for example, when a change in film size is desired). The threading of film through the rolls is simplified, as the operator now has an easy way to separate the nip rolls as opposed to the difficult threading or pushing and drawing of film between the fixed roller sets of the prior art which prior art technique leads to a significant amount of film being wasted before a smooth and hopefully properly aligned/tracking film threading is achieved (e.g., it is estimated that on average 5 to 10 feet of film is wasted in the threading procedure before the film straightens and smoothes). Under the present invention, the access door can be opened to further separate apart the nip roller sets and the film played out into position (e.g. by hand or by using a feed button on the control panel) between the nip rollers and the film tends to naturally stay flat or, if not flat, a quick wiping action will achieve the same whereupon the operator merely needs to close the access door (using the handle 87 to lift up and then rotate the access door's cam latch into locking position). The only film wasted is the length of film that extends beyond the cutting wire, prior to the first cut being made.

An addition advantage of the access door flip open feature is easy access to the edge sealer assembly 91AS. Edge sealer assembly 91AS is described in greater detail below and comprises replaceable edge seal arbor mechanism 1104 featuring arbor base 1108 and a heater wire supporting arbor assembly 1106 with, for example, plug in ends similar in fashion to those described above for the end sealer and cutter wires. Thus the access provided by the door allows for either replacement, servicing or cleaning of the entire edge sealer assembly 91AS or individual components thereof such as the arbor or just the double pin and heater wire combination or the below described high temperature heater wire under support.

An additional not easily accessed and difficult to service component of the dispenser system is the roller canes 90 (FIG. 4) used to prevent undesired extended retention of the film on the driving nip roller. With the access made available by the access means of the present invention, an operator or service representative can readily clean or replace a cane 90. Under the preferred embodiment of the present invention the same easy access to canes 90 means similar easy access to the venting system components, particularly when the venting blade cartridges are used as replacements for one or more of the canes.

Figure 11:
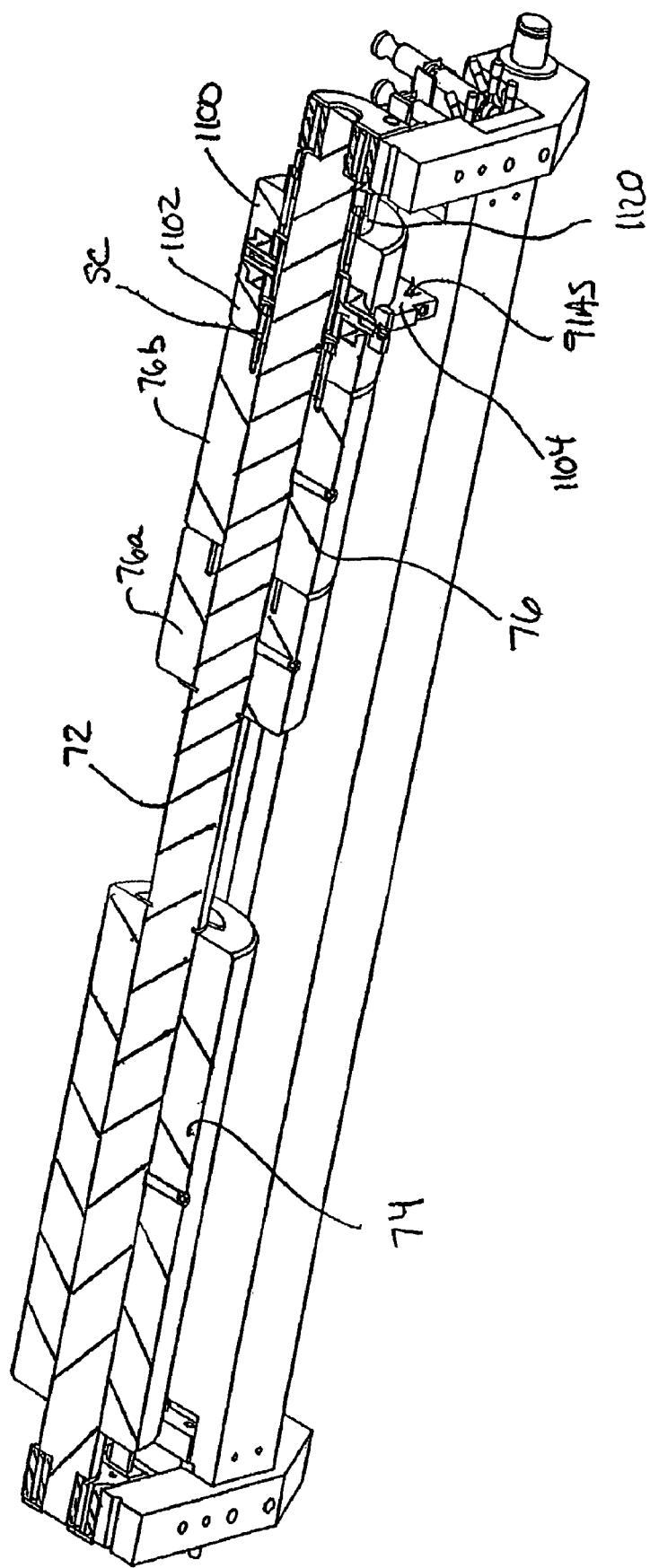
FIG. 11 shows that nip roller in cross-section.
Figure 12:
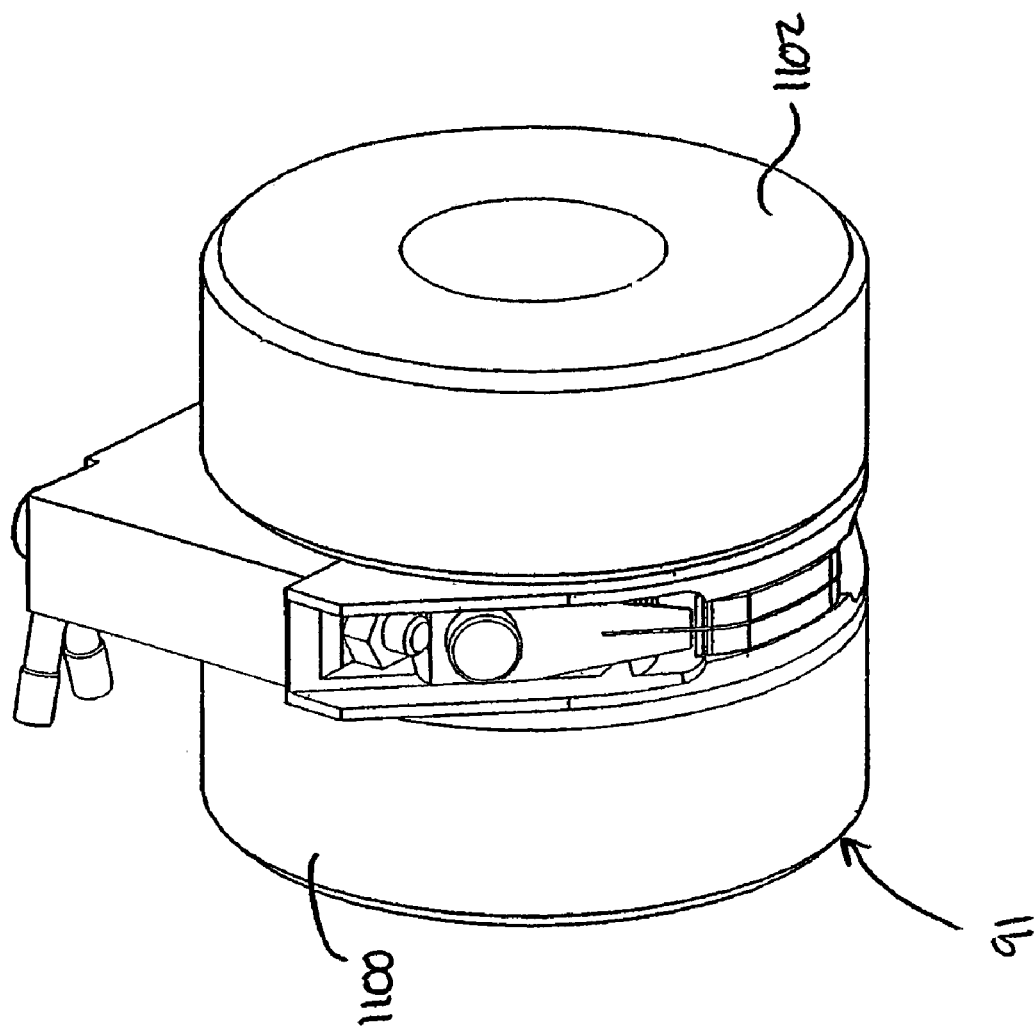
FIG. 12 shows in greater detail the edge seal formation device shown in FIG. 10.

As seen from FIGS. 9, 10 and 11, edge seal assembly 91 is mounted on shaft 72 which is preferably a precision ground steel support shaft supporting aluminum (knurled) driven rollers 74 and 76. Edge seal assembly 91 is shown as well in FIG. 6 on the right side of driven shaft 72 (viewing from the front of the bagger) in a side abutment relationship with driven roller 76. The cross sectional view of FIG. 11 shows driven roller 76 preferably being formed of multiple sub-roller section with driven roller 76 having three individual sub-roller sections 76a and 76b which are included with edge seal assembly 91AS. Edge seal assembly 91AS includes edge seal 91 and roll segments 1100 and 1102.

Thus with this positioning, edge seal 91 is the sealer that seals the open edge side of the folded bag. The open edge side is produced by folding the film during windup of the film on a roll support core, so the folded side does not need to be sealed and can run external to the free end of the suspended dispenser. The present invention features other bag forming techniques such as bringing two independent films together and sealing both side edges which can be readily achieved under the design of the present invention by including of an additional edge sealer assembly on the opposite driven roller such as the addition of a seal assembly as a component of roller 74a. The open side edge side of the film is open for accommodating suspended dispenser insertion and is sealed both along a direction parallel to the roller rotation axis via the aforementioned heated jaw assembly and also transversely thereto via edge sealer assembly 91AS. The arrangement of the edge seal 91 relative to shaft 72 ensures that the sub-roller 1102 will not drag with the edge seal unit, causing it to rotate more slowly than the rest of the driven nip rollers. Sub rollers 76a and 76b are each secured to shaft 72 with a fastener as shown in FIG. 145 as is roller 74. The edge seal sub-roller 1100 positioned on the outer side closest to the adjacent most end of driven shaft 72 is attached to the closest of the shaft collars 1120 positioned at the end of driven shaft 72 and secured to the shaft to rotate together with it. Shaft collar 1120 forces edge seal sub roller 1100 to also rotate as a unit with the shaft 72 in unison with sub-roller 1102 but is independent of that sub-roller except for the common connection to shaft 72.

Figure 13:
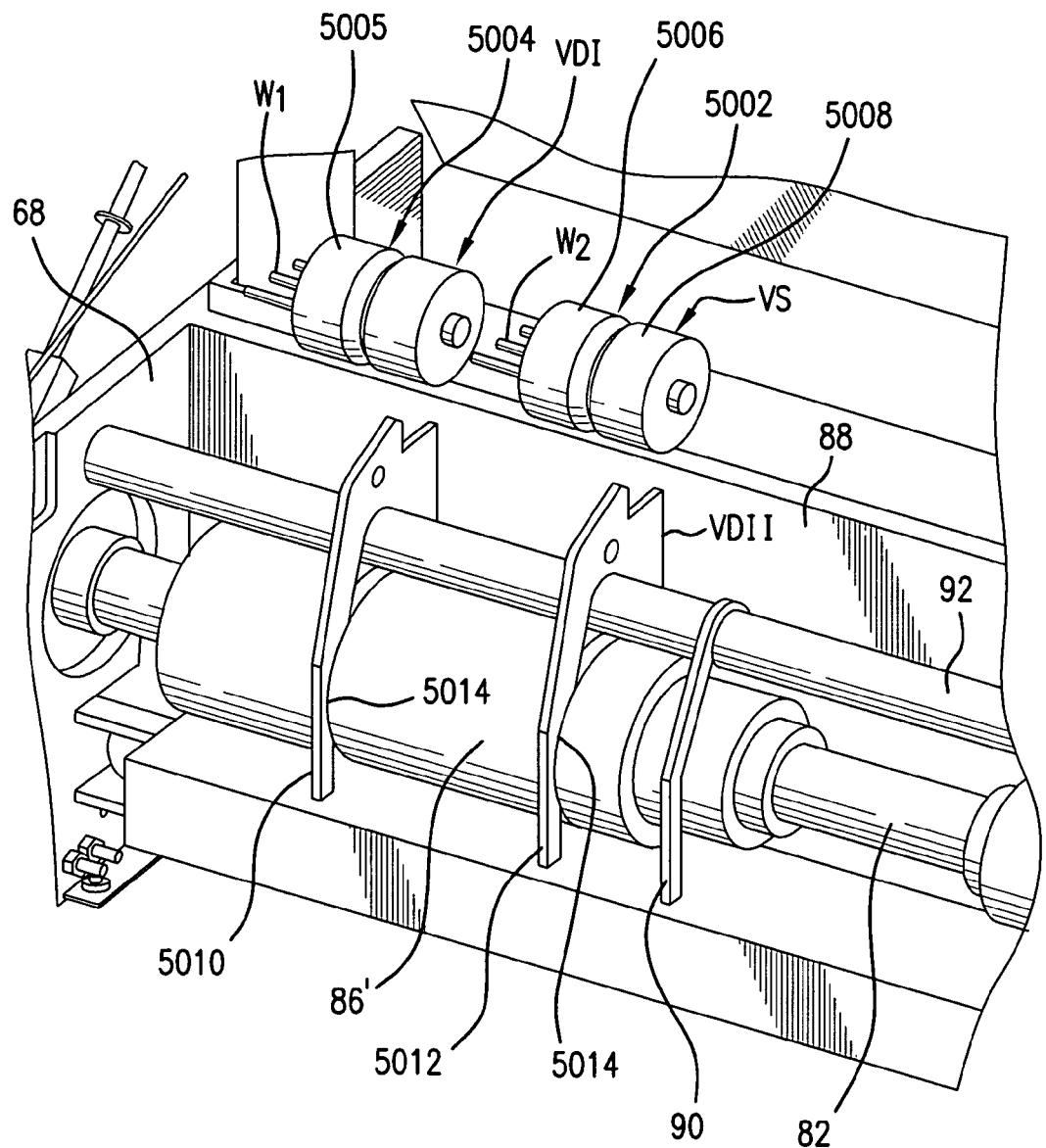
FIG. 13 shows a cut away view of the blade cartridges and associated drivers but with the base mount assembly housing not shown for added viewing of the former.

FIG. 13 illustrates components of a venting system VS (with the base mount assembly not being illustrated for added clarity of the remaining venting system components). Venting system VS illustrated in FIG. 13 features a dual blade venting system comprising first venting device (VDI) and second venting device (VDII) each including a driver device that preferably comprises a driver and a drive transmission for transmitting the driver drive force to a vent adjustment device. In a preferred embodiment the vent adjustment device is a blade adjustment device. Thus, the vent system includes blade driver (5002, 5004), which in a preferred embodiment comprises a rotation solenoid (5005, 5006) although a variety of other driving means are also featured under the present invention as in a fluid pressure driver (e.g., piston), an alternate solenoid device (e.g., a pusher rod) or an inflatable device (e.g., bladder).

Figure 20:
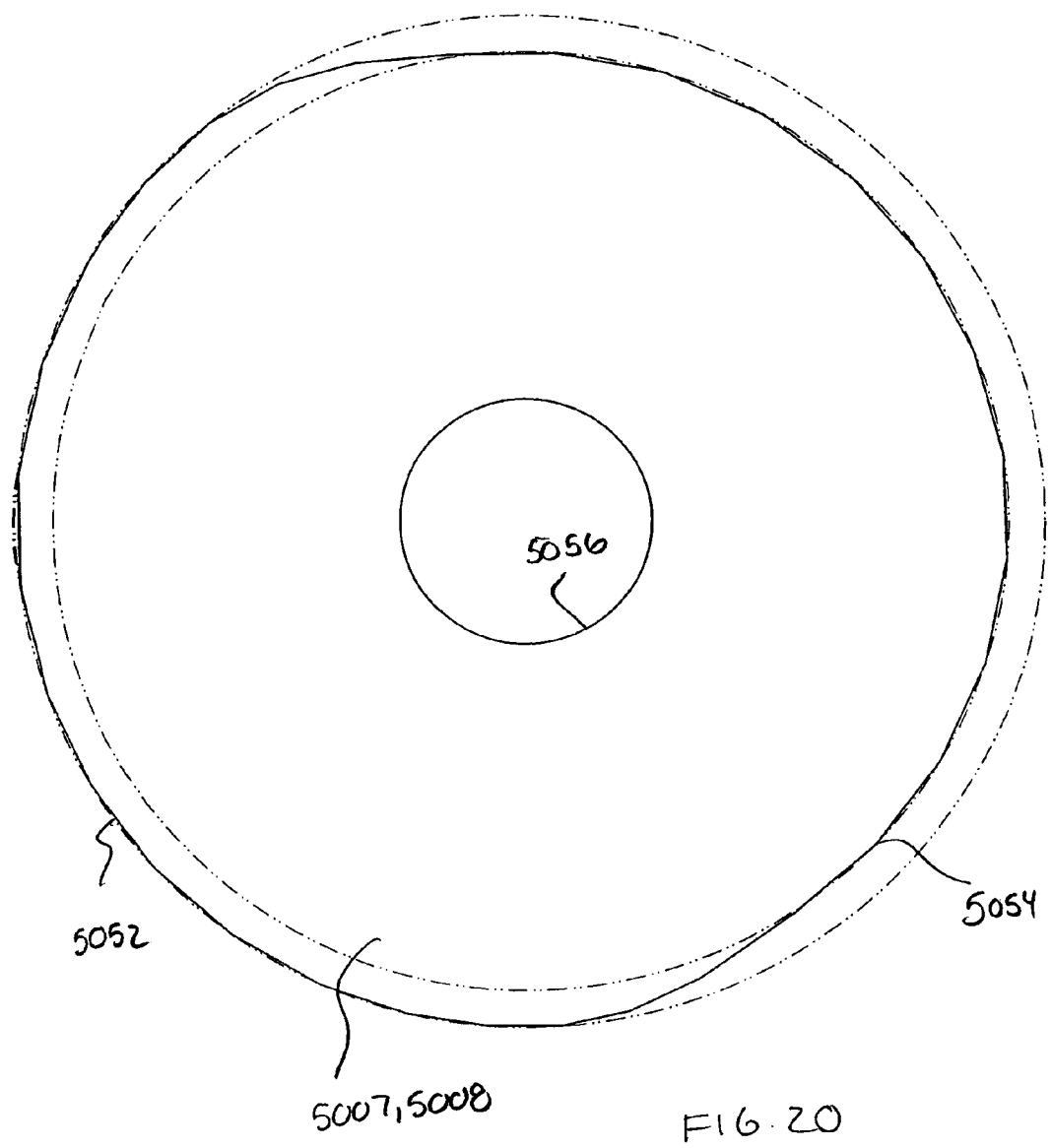
FIG. 20 shows an eccentric cam component of the blade driver.
Figure 21:
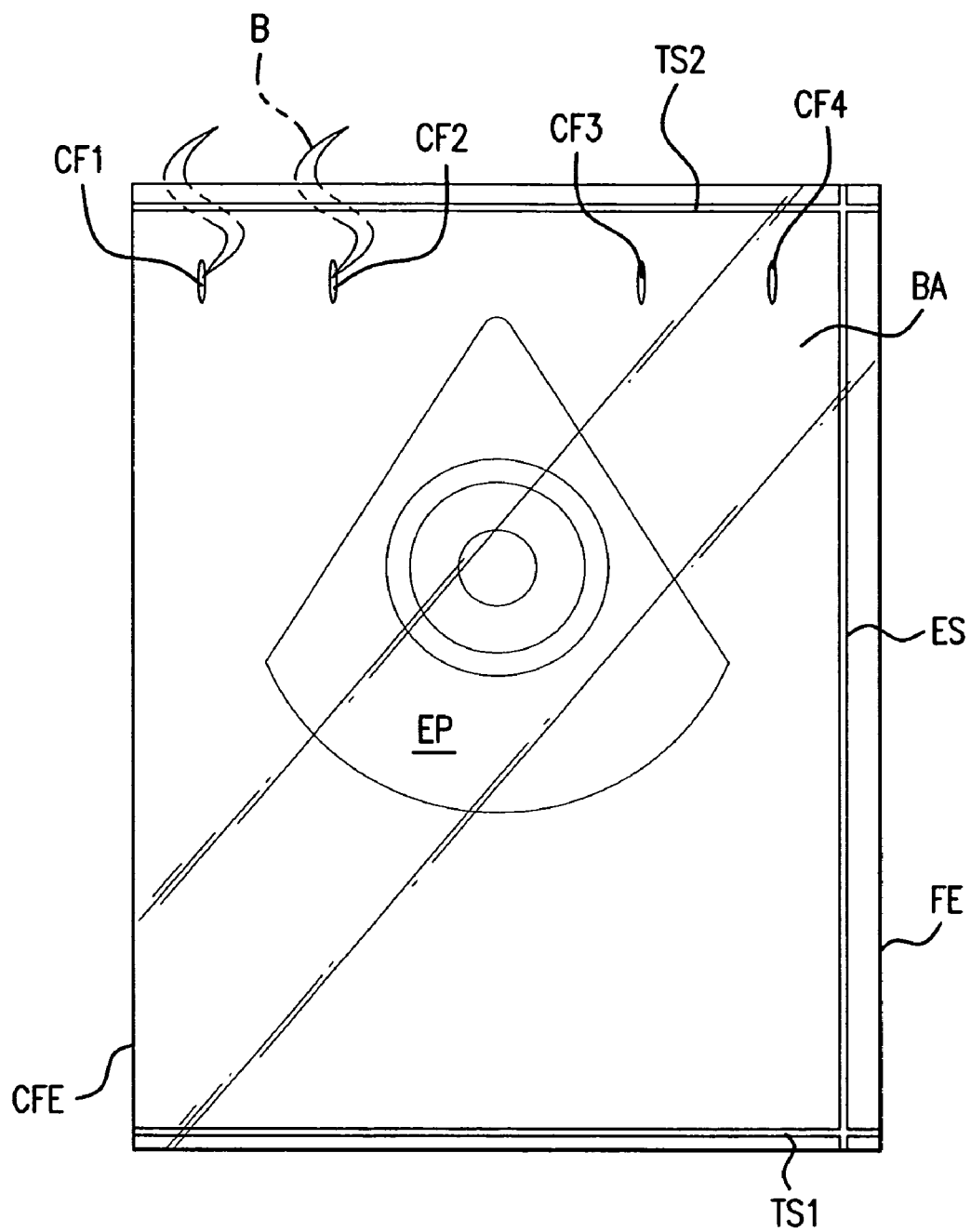
FIG. 21 shows a front elevational view of a bag with foam development and vents in venting operation.

With reference to FIGS. 13 and 20, there is shown eccentric cams (5007, 5008) as the drive transmission for each that are respectively driven by the rotation solenoids (5005, 5006) to provide independent drive devices. The driving devices drive respective vent adjustment devices which preferably are in the form of adjustable blade cartridges (5010, 5012). Preferably the blade movement between film vent mode and film non-vent mode is minimized, (e.g., a 3° rotation or less than an inch extension) and thus the cam eccentricity is also minimized as seen from FIG. 20. Also, while a dual vent system is illustrated, the present invention comprises alternate arrangement as in a single blade venting device (e.g., just VDI), more than a pair of blade venting devices arranged at different locations relative to the film (e.g., to opposite sides of the uncovered intermediate region of shaft 72 as in two to each side having the spacing shown or one centralized one and two assuming the location VDI on respective opposite sides) as well as a combination of different venting system techniques as in the adjustment or moving into and out of contact a heat source in place of a mechanical cutting device or a combination of the mechanical cutting device and heat cutting venting device above. The present invention also features the described venting techniques with the interrupted seal technique described above in combination with, for example, a non-interrupting seal embodiment as in venting system VDI. Preferably, however, all venting carried out is external to sealing line or edge formation as to not disrupt the formation of the same.

As seen from FIG. 13, venting devices VDI, VDII includes blade cartridges (5010, 5012) which are preferably designed to assume the position of a removed cane 90 with a preferred embodiment featuring positioner ring grooves 5014 formed in roller 86 of the roller that is preferably formed of a compressable high friction material as described above for roller 86).

Figure 14:
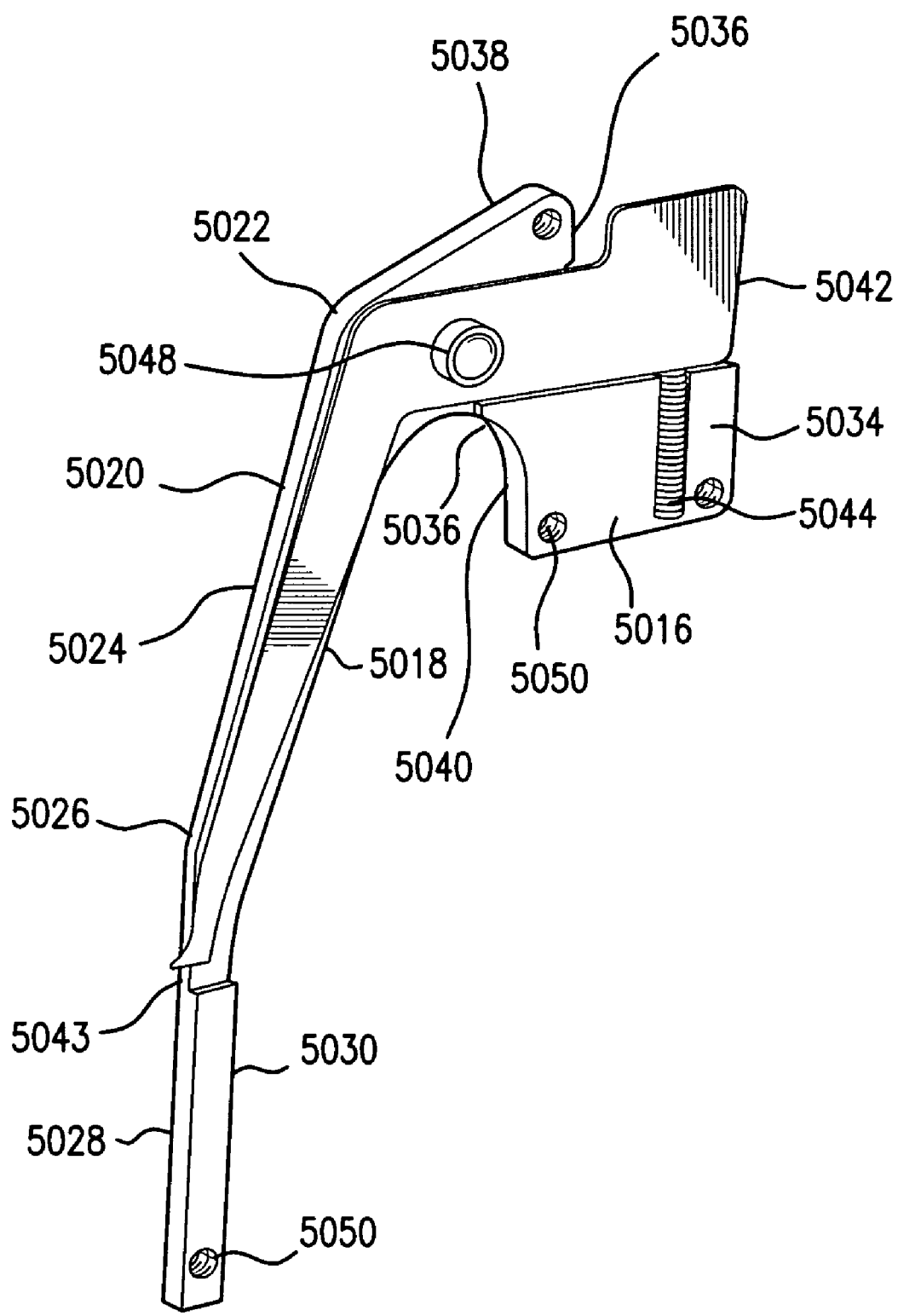
FIG. 14 shows the blade as mounted on one of the two component blade housing of the blade cartridge.
Figure 15:
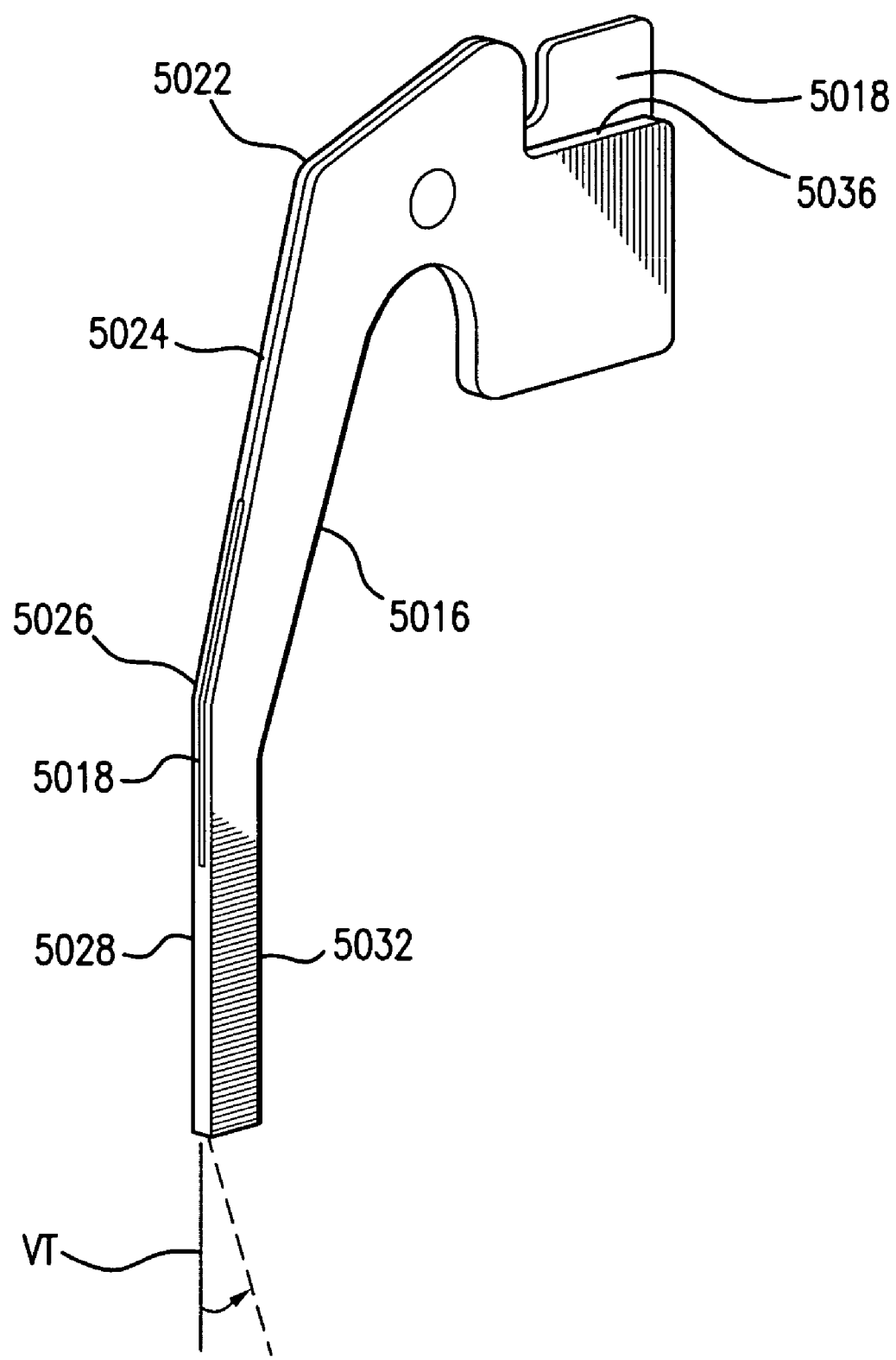
FIG. 15 shows the full blade cartridge with the second of the two blade housing components in place.

With reference to FIGS. 13, 14 and 15, each adjustment device is shown in the form of a blade cartridge that comprises blade housing 5016 for housing blade 5018. While the adjustment device (5010, 5012) preferably includes a blade housing for minimizing operator blade contact, it can also comprise a film material vent formation device alone as in a blade without covering housing. Housing 5016 is formed of a low friction plastic which facilitates the added cane function or film wrap around preclusion means provided by housing 5016. In this regard, as seen from FIG. 13, the interior nip portion 5020 (that portion having an exposed edge inward relative to or closer to opposite film drive roller in nip region of bend 5022) of housing 5016 has an inwardly sloped edge 5024 extending down and inward toward the opposing nip roller or roller set to help in guiding the film into a proper nip location, in the event it floats away from a desired film path (e.g., a vertical plane orientation). The downward and inward sloping edge 5024 extends to a second bend section 5026 that leads to a lower section 5028. To help facilitate smooth passage through the general nip zone, the lower section is preferably arranged vertically (See VT line in FIG. 15) or outward as represented by the angle line to allow for passage of the film past the nip contact region. While also precluding a drawing up of the film with the roller as the roller continues its rotation in similar fashion to a cane's function. That is, as seen from FIG. 13, the configuration conforms to the slope and configuration (e.g., vertical configuration) for canes 90 with the relative dimensions of the housings and canes (e.g., axial thickness and depth) being essentially the same to provide a consistent contact plane across the film surface in contact therewith and to facilitate placement of a venting device at a location previously occupied by a cane or suited for such occupation. For example, the canes and vent system housing are preferably used in combination although alternate arrangements are contemplated such as where the venting system provides the only means for film draw or curl around preclusion or the venting system is not relied upon for any film curl around preclusion, function. In the illustrated embodiment, housings 5016 provide the function of avoiding a curl back around the roller, with the extension of the lower sections as in lower section 5028 sufficiently down below a maximum compression point in the nip contact region (e.g., 1 to 5 inches) facilitating this activity. As seen, both the housing's sloped edge 5024 and less sloped, more vertical lower section 5028 lies on a common support side relative to a vertical plane through the nip or film contact by film driver location. The interior edge of the lower section 5028 preferably extends parallel with the film path and very close transversely relative to a horizontal plane extending through the lower section, as in less than 10 mm and more preferably less than 5 mm (e.g., 0 to 3 mm) with 0 representing a constant guide engagement and 3 mm representing a guide engagement for a small deviation in any film path travel.

FIG. 14 illustrates first housing component 5030 of the illustrated two part housing with FIG. 15 showing the second housing component 5032 arranged flush on the interior surface 5034 of first housing component 5030. Also the interior surface 5034 of housing component 5028 includes a groove or recessed region 5036 within which the blade 5018 rests and which allows for sufficient movement of blade 5018 to achieve the film venting and film non-venting modes. In the upper region of component 5028, the groove is bordered by upper segment 5038 and outer back segment 5040 with the former extending more inward to expose the driver transmission contact end 5042 of the blade. Back segment 5040 is shown as receiving spring 5044 which urges the venting or blade cutting edge contact end 5043 into a retracted into a housing or film non-venting mode (FIG. 14 illustrates the blade in vent mode due to the driver positioning of the blade, while FIG. 15 illustrates the blade in the recessed non-vent mode also preferably due to drive adjustment with the help of a biasing return device). The preferred pivot post 5048 is shown arranged in trunnion fashion within reception apertures in the two components of the cartridge housing. Suitable housing component fastening means 5050 is provided to clamp the blade in position as in a removable screw arrangement and is preferably used together, with an expanded head at opposite ends of pivot post 5048, as in a double head arrangement fastened together as by a pivot post with telescopic threading arrangement. The blade is dimensioned so as to generally conform to the shape of the cartridge housing and such that only its pointed tip (or similar function cut edge) and preferably also a short base section therebehind (suitable for driver device contact) extend out from the cartridge when in film vent formation mode. When in a retracted home mode, the cut edge is retracted within the confines of the housing.

FIG. 20 shows the eccentricity of the driver cam 5007, 5008 and its partial conformance to circle section 5052 and its recessed section 5054 as well as its central rotation shaft reception hole 5056. When the rotation solenoid places the non-recessed section 5052 into contact with the blade contact end 5042, the blade is caused to pivot about post 5048 so as to extend into slicing contact with at least one and preferably both segments of the two film layers as in the two film layers of folded over C-fold film. When the recessed section is rotated into place relative to contact end 5042, the blade pivots about pivot post 5048 preferably with the help of the action of a return biasing device as in spring 5044 into the film non-contact or non-venting mode. Also, as seen from FIG. 13 each of solenoids or drivers 5005, 5006 has wiring W1,W2 extending into it to achieve controlled solenoid movement in conjunction with control unit CU. For example, the eccentric cams can be adjusted by the solenoids independently to achieve different length slices in the bag in need of venting such as a longer one closer to the C-fold and a shorter one more inward.

Figure 13A:
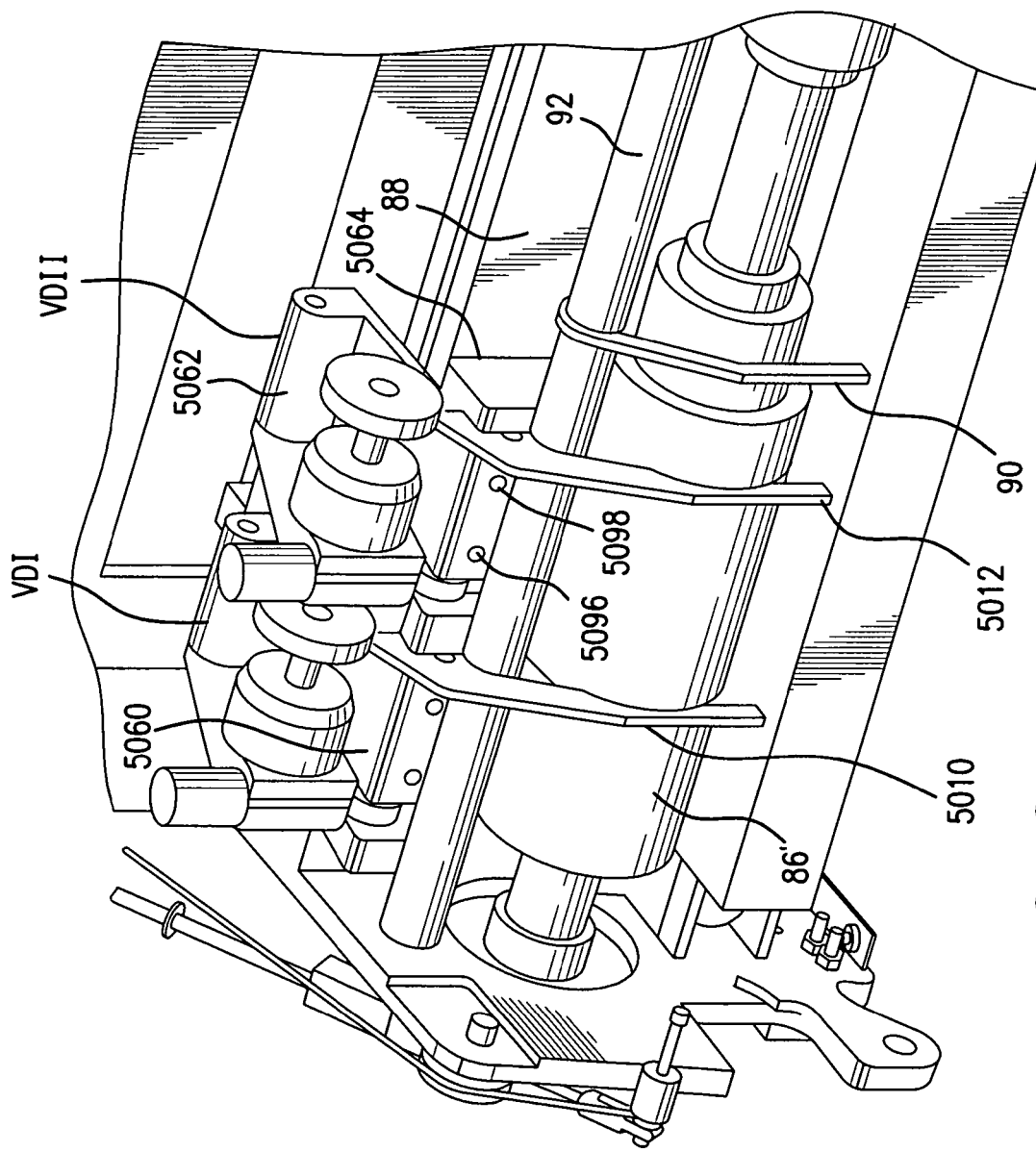
FIG. 13A shows a similar view as FIG. 13 but with the base mount assembly in place and in a lock in position state.
Figure 13B:
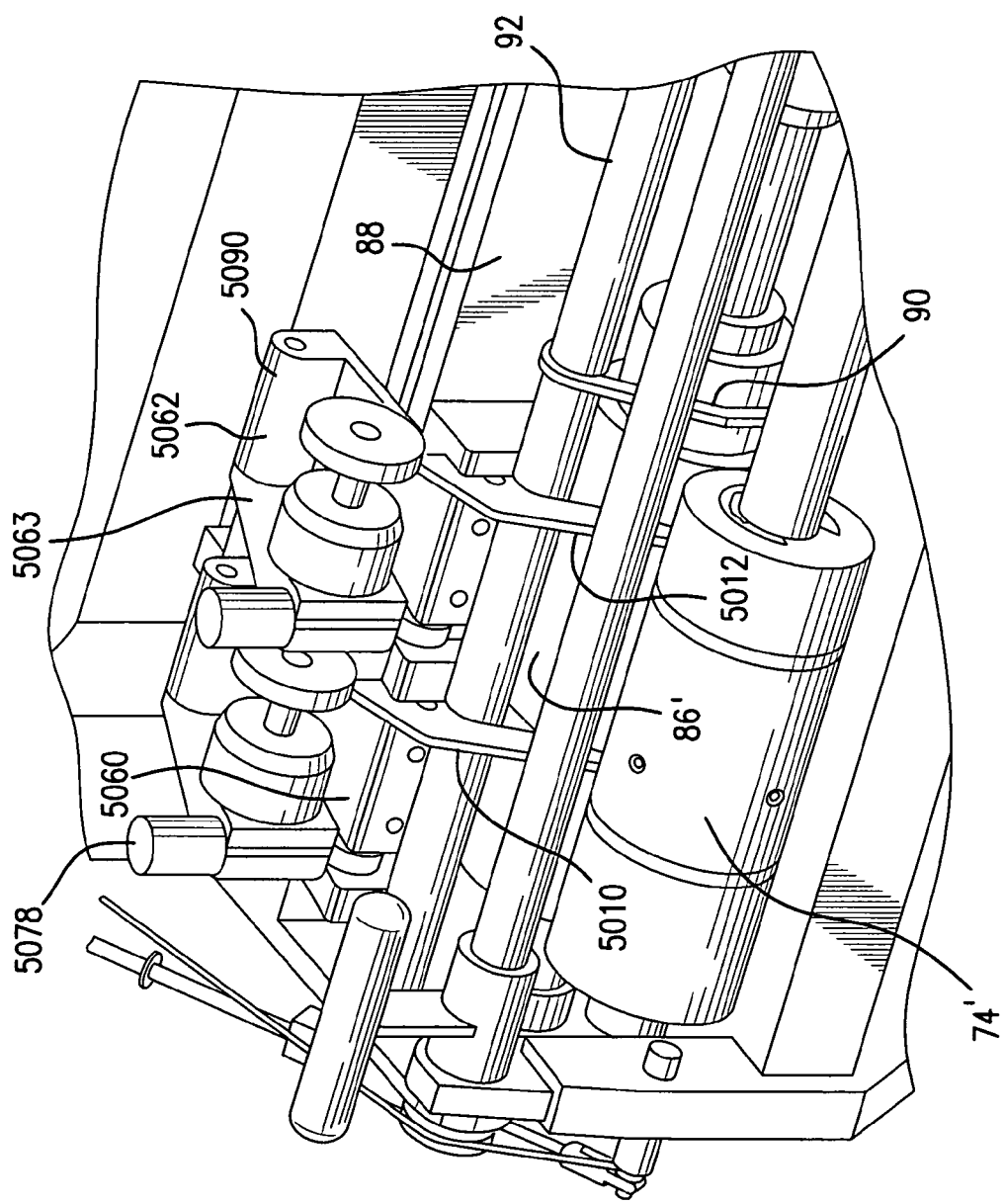

FIG. 13A provides a similar view as that in FIG. 13 but for the inclusion of base mount assemblies 5060, 5062 for venting devices VD1 and VD2 (shown incomplete in FIG. 13). In a preferred embodiment the base mounts are designed for supporting both the driver and the blade cartridge and are preferably designed for tool-less placement and removal relative to the remainder of the bag forming assembly. That is, each of base mount assemblies 5060,5062 preferably has hand operated release and clasping means (combined or dual release and clasp joint (single structure) functioning means or independent means for each function that an operator can manipulate with direct hand contact without the need for a tool to achieve operational positioning or release). As seen from FIG. 13A the preferred arrangement positions base mount assemblies 5060, 5062 in between the base wall 88 and the cane support rod 92 with each or just one of components 88 and 92 providing direct contact support.

Figure 13C:
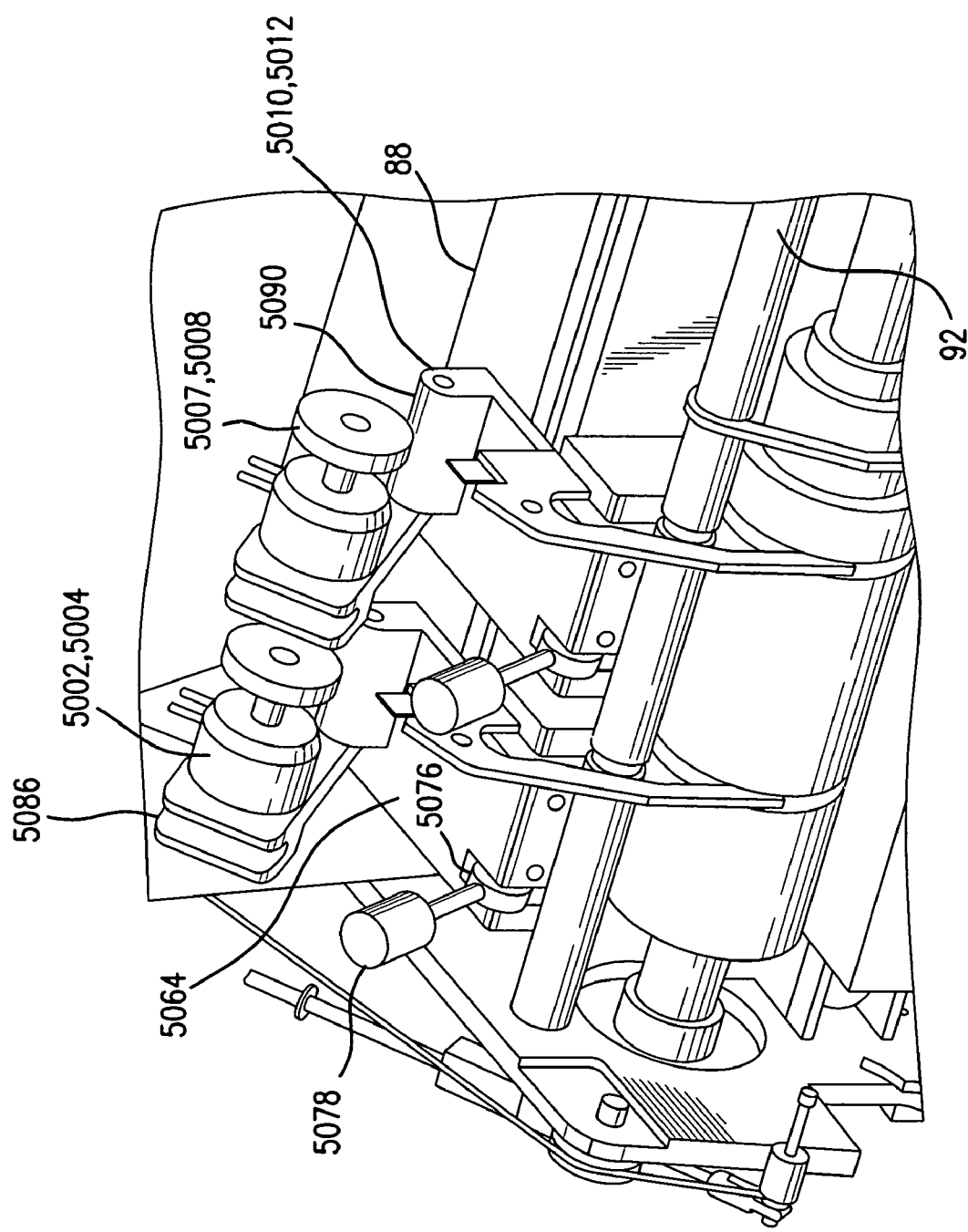
FIG. 13C shows that which is shown in FIG. 13B but with the base mount assembly in an unlocked state and the blade cartridges in the state of being removed (or reinserted just before lock down).
Figure 19A:
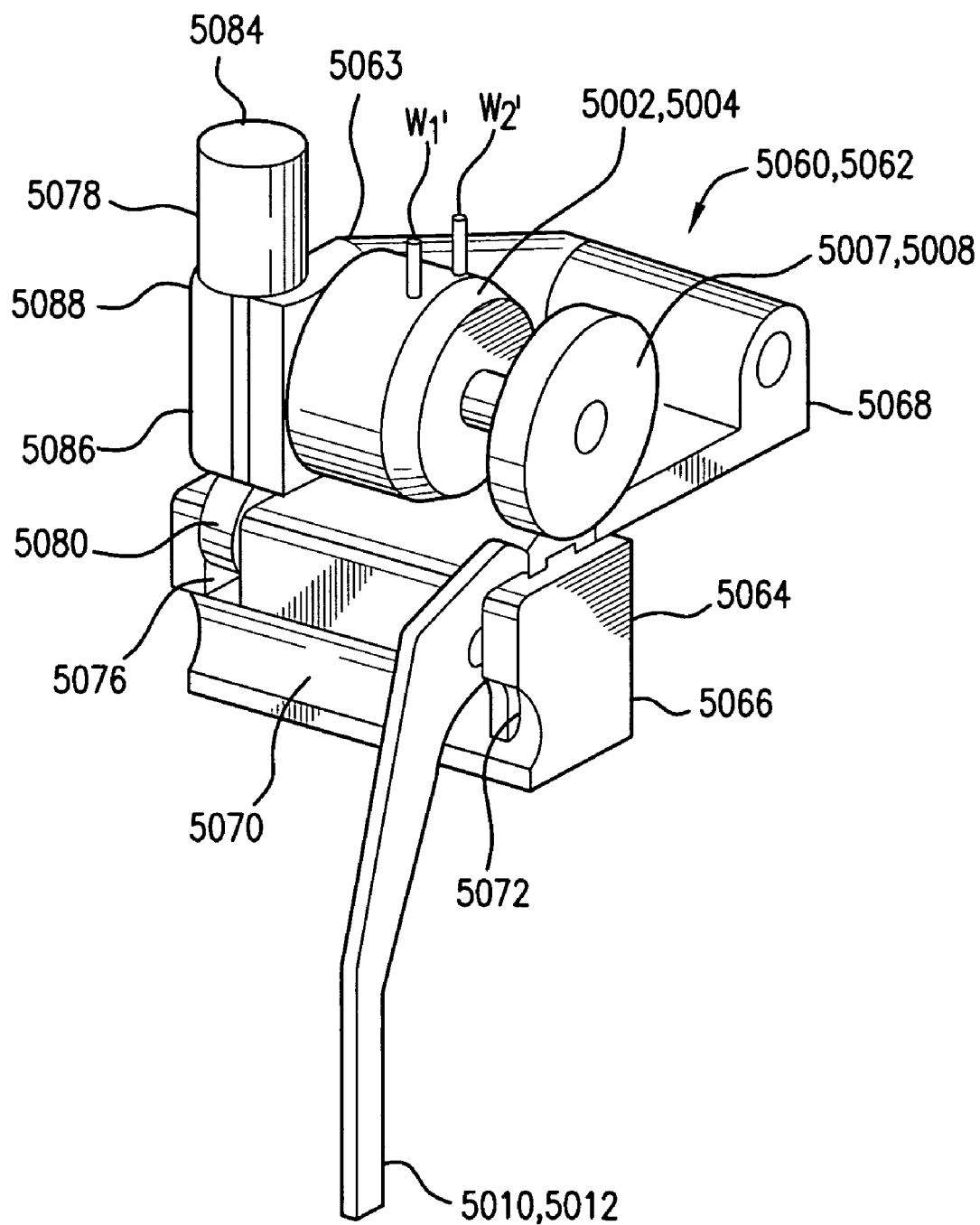
FIGS. 19A to 19E show various states of the blade mount assembly featuring a blade cartridge, blade driver and base mount assembly and means for locking down and releasing of the blade cartridge.

With reference to FIGS. 19A to 19E there is provided additional discussion of the base mount assemblies 5060, 5062 which are preferably one and the same, although the present invention includes variations such as a single base mount for the two blade cartridges with the same or different driving mechanisms or different base mounts designed to accommodate different locations relative to the foam-in-bag support and film path. As shown in FIG. 19A base mount assembly (5060, 5062) includes a driver support 5063 and a main base section 5064 shown as having an L-shape with a first leg, or segment 5066 preferably designed for foam-in-bag support cane-bar contact and a second leg or segment 5068, preferably designed for back wall 88 contact. Because of the positioning of driver support 5063 the control wiring (W1', W2') is shown in an alternate "radial" arrangement relative to driver (5002, 5004). As also shown in FIG. 19A, segment 5066 comprises a concavity 5070 designed to conform to cane support bar 92 as well as a venting system adjustment device (e.g., blade cartridge) reception slot 5072 shown in a preferred embodiment opening out both at the top of base section 5064 and into concavity 5070. As seen from FIGS. 13A and 19A the blade housing cartridge is maintained in locked position with the drive device (e.g., eccentric cam (5007, 5008)) forming an upper blocking component and the cane rod 92 or alternate foam-in-bag "FIB" dispenser system support forming an inner blocking component with segment 5066 completing the enclosure of the upper end of the blade cartridge (5010, 5012) except for the rear opening 5074 of the reception slot for the blade cartridge. At the opposite axial end of segment 5066 there is provided release lever pivot reception slot 5076 within which extends across a release lever pivot post (not shown). As best seen in FIG. 13C the "FIB" support is preferably is in the form of, support shaft 92 that has a series of spaced apart shaft notches or recesses 5087 that are shown in the preferred embodiment suited for receiving either ring grooves canes 90 or adjustment devices (e.g., blade cartridges) 5010, 5012. This arrangement thus provides a degree of position retention (e.g., along the axial length of shaft 92), which in turn, helps maintain mounting base 5064 in position. This also provides for easy retrofitting of previous systems by replacement of a cane with a venting device or shifting the location of venting along the width of the bag to better accommodate different bag widths. As seen from FIG. 13A, blade cartridges 5010, 5012 also have their interior nip housing portion 5020 received within reception groove rings formed in roller 86 which also provides a slide preclusion function relative to base mount 5063.

Figure 19B:
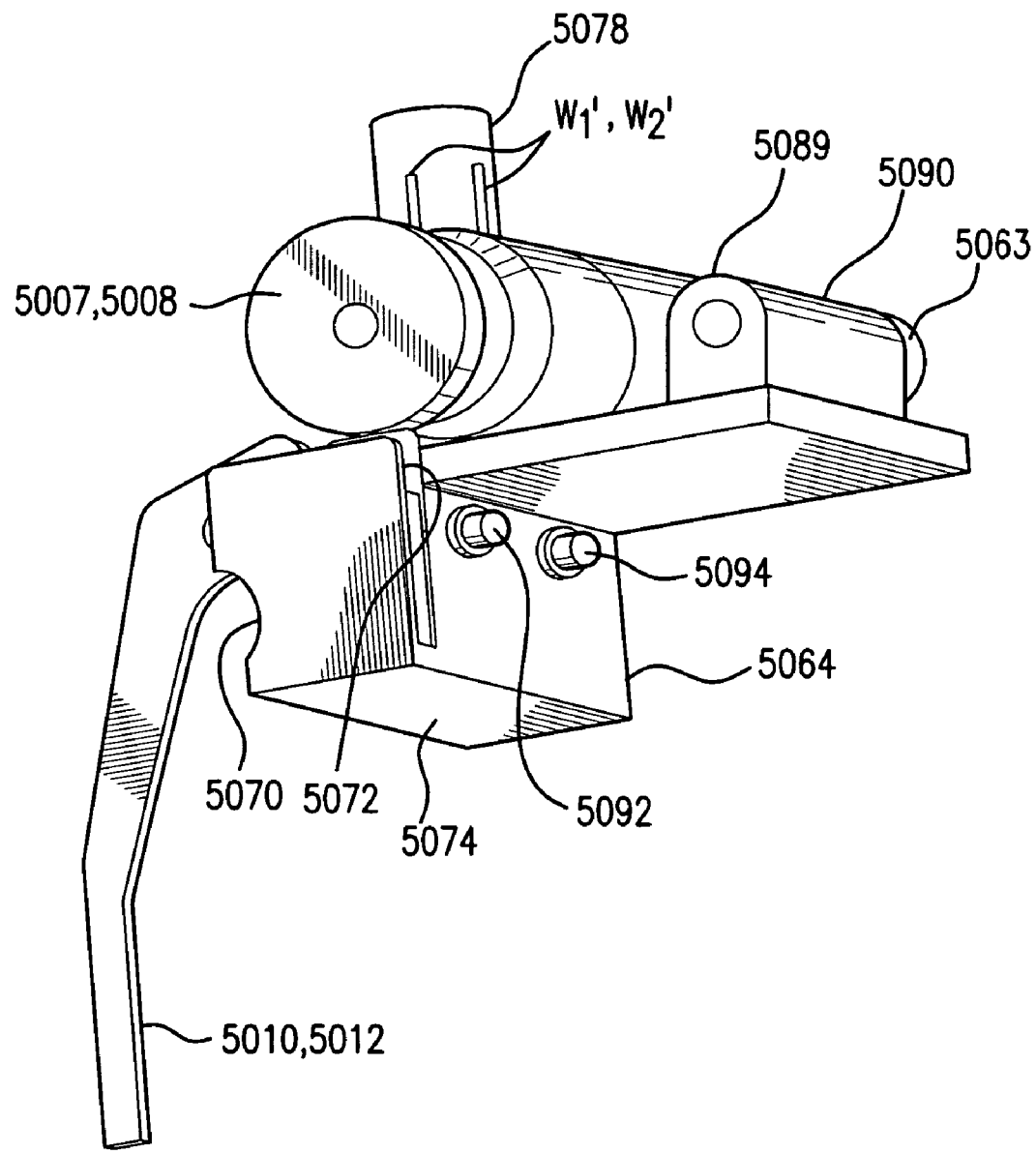
Figure 19C:
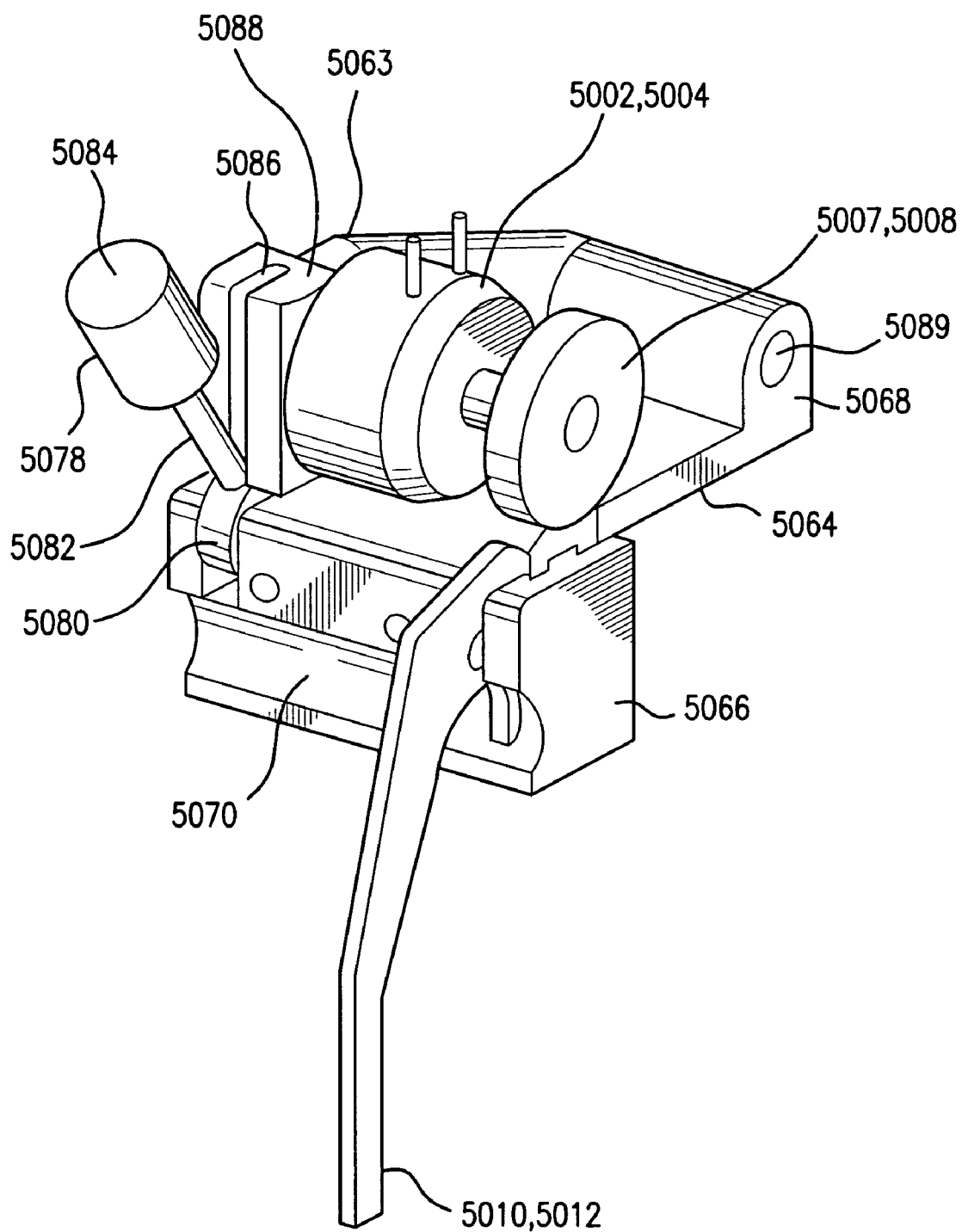

Release lever 5078 is shown best in FIG. 19C and includes a pivot attachment base 5080 (pivotably connected to the noted release lever pivot post), a lever shaft 5082 and an enlarged head (preferably also functioning as a grasp handle) 5084 at its free end. From a comparison of FIGS. 19A and 19C there can be seen that the length of shaft 5082 and the shape of head 5084 provides for the shaft section to nestle within a vertical slot 5086 formed in driver support 5063. Thus, when the release lever 5078 is placed in the illustrated vertical orientation the lever shaft is received within slot 5086 and the enlarged head is in contact with the upper opening bordering region 5088 for slot 5086 with the dimensioning being such that a frictional lock down relationship is established between driver support 5063 and the releasably fixed in position base section 5064.

Figure 19D:
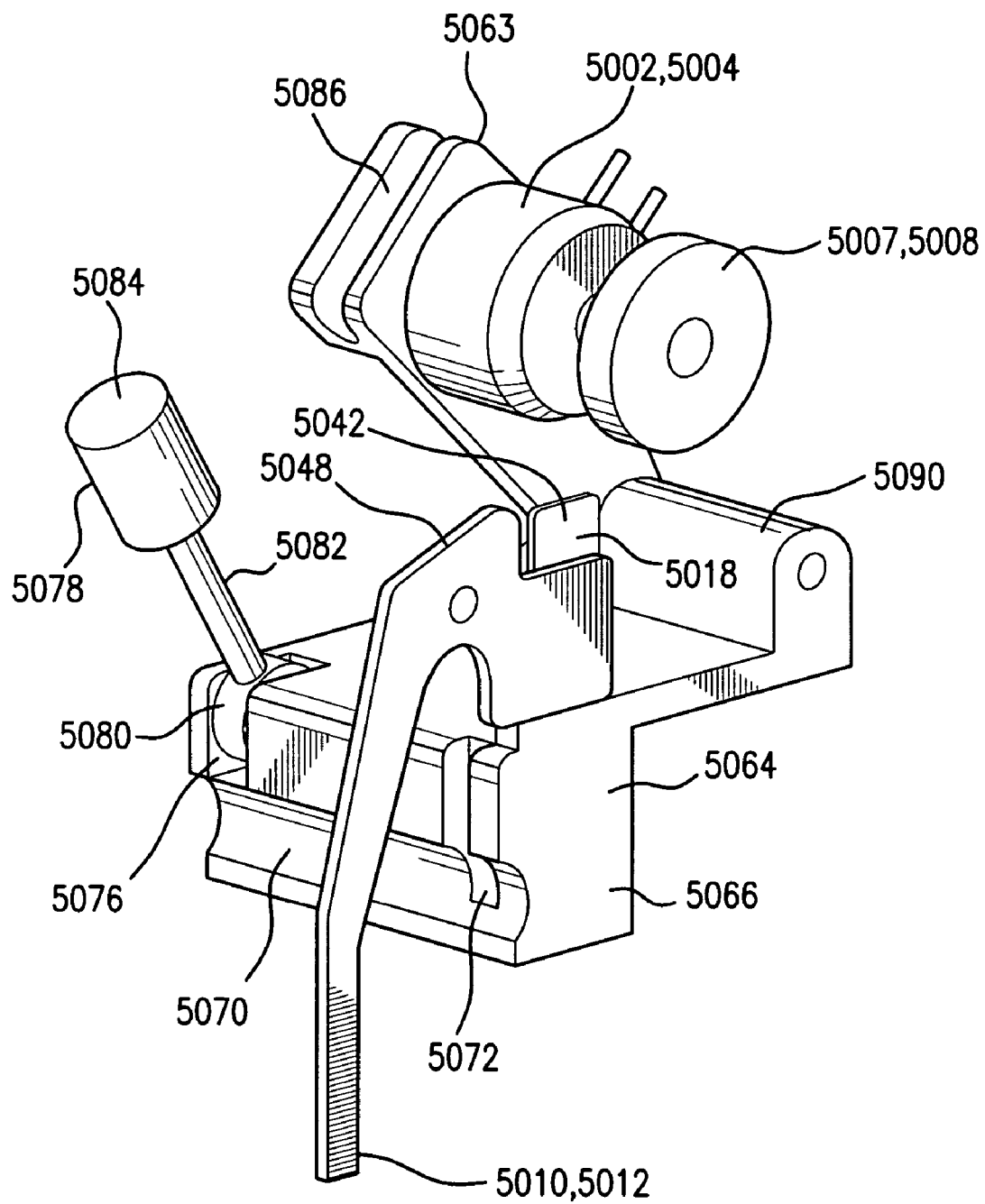
Figure 19E:
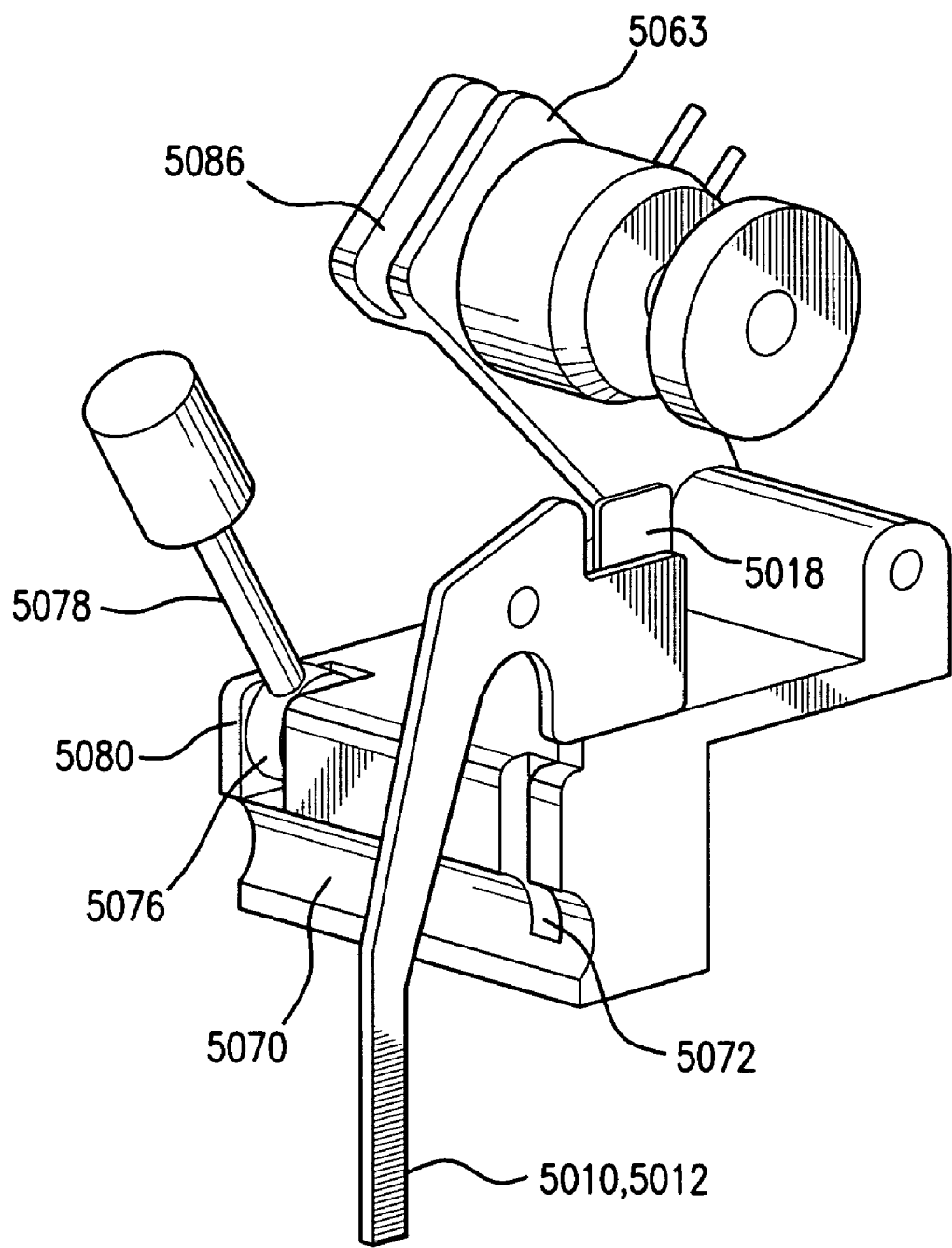

As seen from FIG. 19D upon rotation of release lever 5078 from its nestled arrangement within slot 5086 in driver support 5063 (vertical orientation in the embodiment illustrated), driver support 5063 is free to pivot up by way of a pivot extension of driver support 5063 extending into aperture 5089 formed in pivot housing 5090 forming an upper extension of segment 5068 of main base section 5064. FIGS. 13C and 19E further illustrate that upon the pivoting of driver support 5063 with connected driver mechanism with driver (5002, 5004) and eccentric cam (5007, 5008), the blade cartridge (5010, 5012) is released from its lock down state and can be slid upward and outward from slot 5072 and removed for easy servicing (e.g. blade refurbishing or cartridge replacement).

With reference to FIGS. 19B and 13A there is illustrated main base section 5064 having projections 5092 and 5094 which are preferably screws with swivel pads to locate and lock to the front surface of the film handler frame 88 with the screws of the projections being received within corresponding screw apertures 5096 and 5098 formed in base mount section 5064 and preferably having compressible material for projections 5092, 5094 (e.g., compressible medium friction rubber screw heads). Accordingly, with the driver support section 5063 pivoted up either the blade cartridges alone can be removed or, instead, the entire venting device (VDI and VDII) can be removed by removing the cartridges and sliding out the base mount section following a slight rotation to clear concavity 5070 with adjustment/compression of projections 5092 and 5094, if required. Moreover, all this can be done free of tools by direct hand manipulation. A vent device can thus either be removed or shifted in position (as to another cane location) for a different vent pattern as may be confronted when dealing with a bag size or configuration (e.g., gusseted) change.

Figure 16:
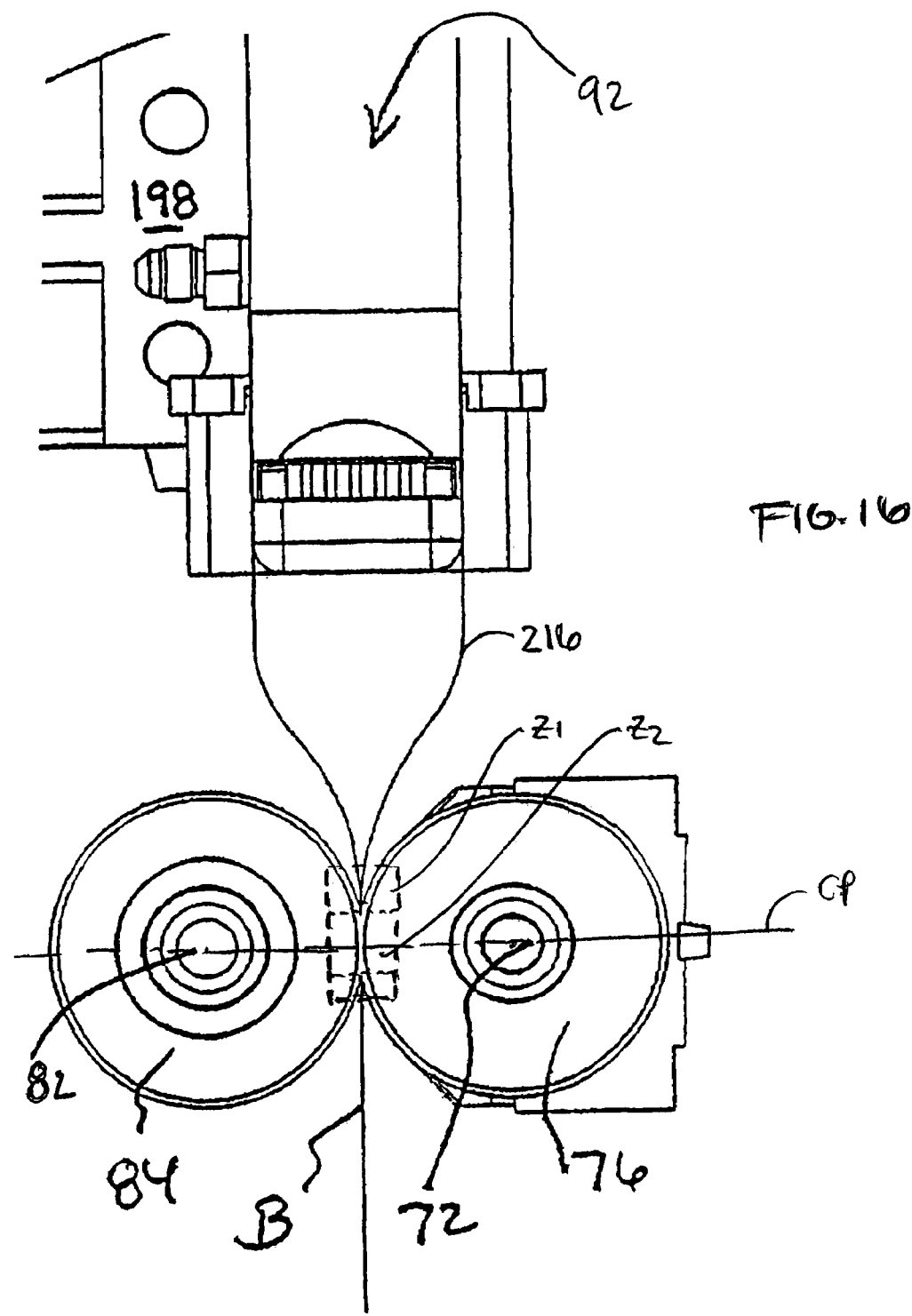
FIG. 16 shows an expanded view of a portion of FIG. 7 with a zone designation as to the preferred film cutting location for the adjustable blade.
Figure 17:
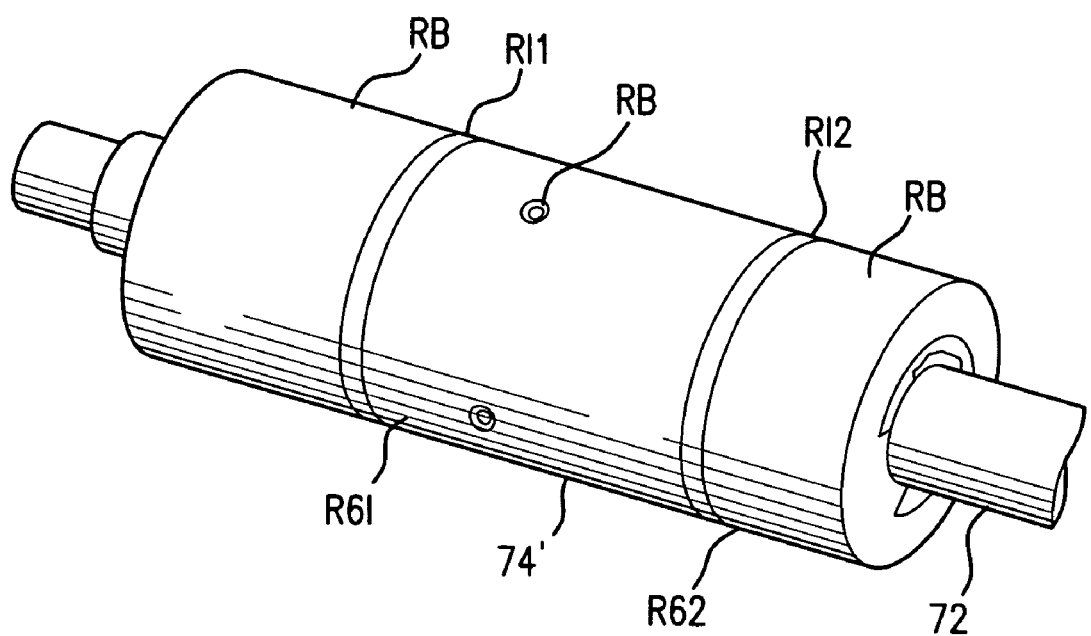
FIG. 17 shows in cutaway a nip roller embodiment featuring a blade reception ring formed of a different material than the main body of that roller.

FIG. 16 illustrates the film feed through the dispenser assembly with film 216 extending around dispenser head 192 and within a nip region between rollers 76 and 84 where it is formed as a bag with foam precursor B as it exits the nip region. In a preferred embodiment venting with the venting device (VD1, VD2) is carried out by forming a slit in both the front and back film sheets (both folded film segments of C-fold film or both individual sheets of a two sheet feed) as the material is in a nip roller compression region zone. In this way added venting is provided as gas can escape from both the front and back cuts formed in the bag material as represented by vents CF1 in the font of bag B and CF2 in the rear of bag B preferably formed from a single blade within one of cartridges 5010 and 5012. By cutting within the nip roller compression zone the film layers relationship and positioning is more assured and provides for a minimization of blade or cutting device extension (e.g., less than a 5° angle of pivot range). The blade to film contact region is preferably within a nip zone or region represented by the vertical diameter of the nip rollers in the vertical direction (height) and the same along the horizontal plane (width) with the center preferably taken at the maximum compression nip point. More preferably the nip zone within which the venting takes place on the film is bordered by a rectangular configuration, with the height being the noted roller diameter and the width being less, as in ¼ to ½ of a minimal dimensioned roller diameter centered at the compression point (a ¾ to 5 inch range and more preferably 1 to 3 inch roller diameter range is illustrative). Also, if the film driving means is in the form of a conveyor arrangement, a similar "vent zone" is applicable based on the above. Preferably the venting location is within zone Z1, as shown in FIG. 16, which shows a rectangular zone having an intermediate 66% of the nip rollers diameter height and a lateral width of 33% or less of the roller diameter. More preferably all venting takes place within zone Z2 representing plus/minus 15% (above/below the central horizontal plane CP extending through the shaft 72,82 centers ) of the full diameter of either of rollers 76 or 84 and with the width range being less than a ¼ inch to each side of the nip point or region on the central plane and more preferably down to an ⅛ inch or less width. In other words in a preferred embodiment the vent cut(s) is/are formed at the level of the central plane CP and preferably within an inch or two above and below that plane representing the point of major film compression (inclusive of the situation of where a conveyor or other device is used as a nip forming roller assembly) and within ⅓ inch to each side of that major compression point or region.

Figure 18A:
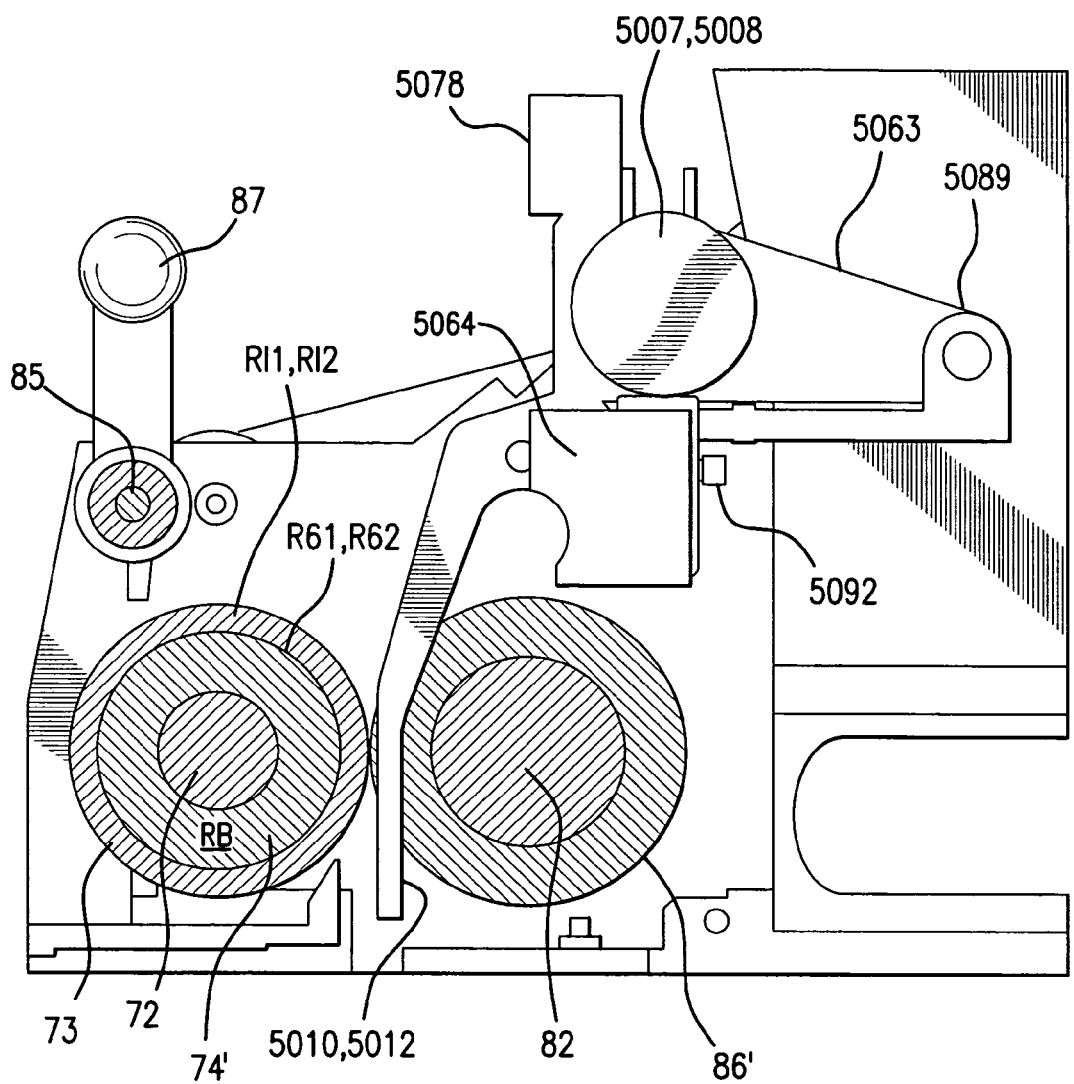
FIGS. 18A and 18B show in cross-section the relationship of the blade cartridge and nip rollers and base mount section with FIG. 18A showing the blade in a retracted, home mode on the vent device support side of a vertical plane through the nip location and FIG. 18B showing the blade extending into the ring material of FIG. 17 during film vent cutting.
Figure 18B:
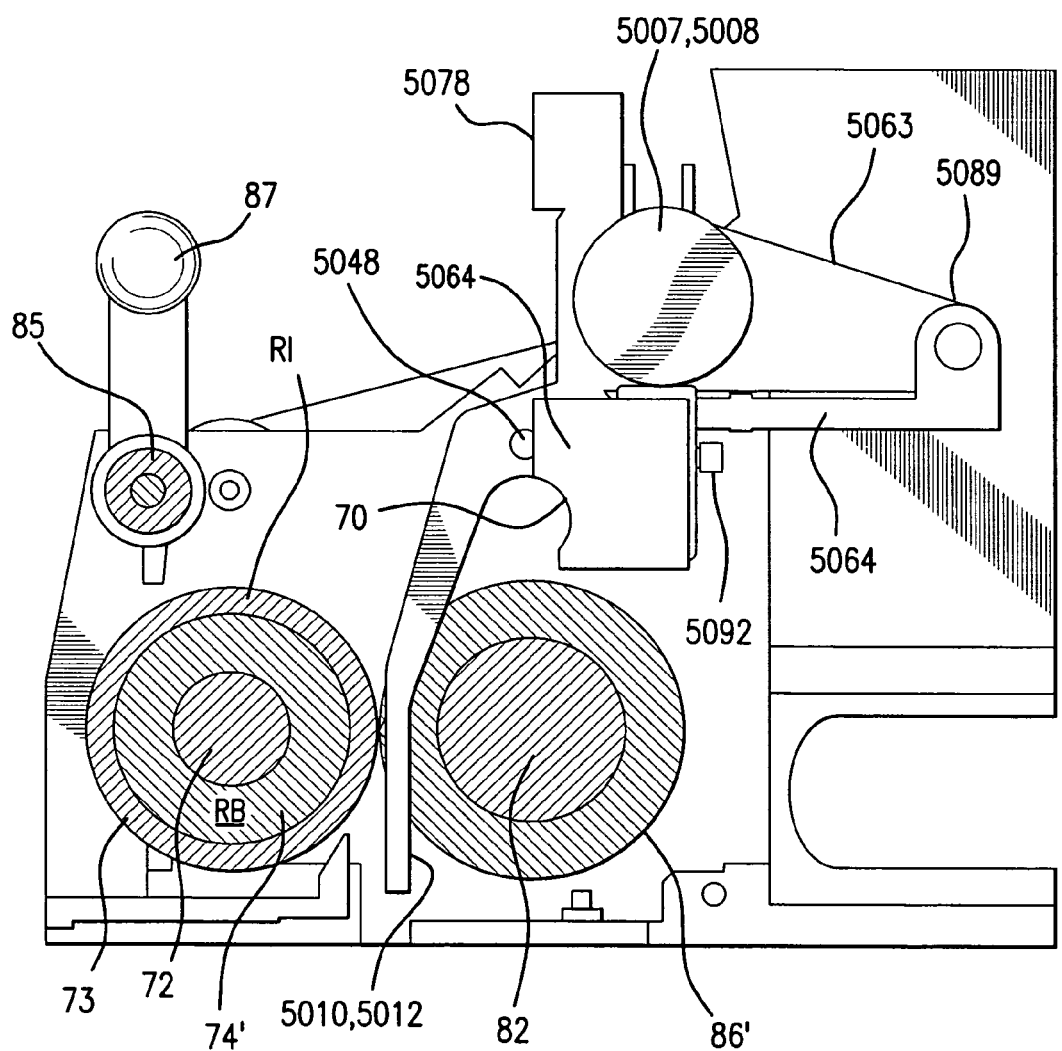

The vent formation by way of movement of the venting device to opposite sides of the central plane region is seen from a comparison of FIGS. 18A and 18B, with FIG. 18A showing the blade in a retracted state within cartridge (5010, 5012) and FIG. 18B showing the blade swung or otherwise moved out (e.g., a 3° swing via movement of the eccentric cam of the driver) into the film path and through both film layers. In addition, the blade tip is shown as extending past the film plane (while cutting through the double film layer) and into the circumference of the opposite roller 74'. As roller 74' is preferably formed of a knurled metal, to avoid rapid wear of the blade, roller 74' comprises in the receiving path area of the adjusted blade, a softer material ring (RI1, RI2) such as silicone that can receive the blade tip without wear of the blade tip or slowing down of the roller travel to any significant degree, while also being able to retain its body mass despite the cutting of the receiving ring (RI1, RI2) which can be snapped into position within reception grooves RG1 and RG2 formed in roller 74' between the main roller body of, for example, aluminum represented by RB. Just an open space or unfilled gap can also be utilized to receive the blade or adjusted cutting mechanism to the interior of the outer circumference of the driver roller on the opposite side of the film path relative to the side having the base mount support for the adjusted cutting device. A filled gap is, however, preferable for smoother film transport and avoiding wrinkling. Note, a unitary or monolithic cutting blade body is preferred as the venting adjustment device that is capable of assuming a retracted, no vent position to one side of the film path in the nip zone (and preferably on a common side as that where the base mount exists), and a venting state following adjustment of the blade into contact with the film material of the film path and then through that film material to an opposite side of the film path at the nip zone, and then preferably farther away and into a receiving gap in a structure on that opposite side of the film path plane. Preferably the structure receiving the blade on that opposite side is a roller that has been modified to avoid blade dulling. This arrangement provides for coinciding the blade cut at the same location as the maximum compression area of the film material being driven through the nip zone. Rather than reliance on a cutting blade, an adjustable body such as one similarly supported or arranged like the blade can be moved into and out of venting/non-venting modes by the adjustment driver and carry a cutting device such as a heated attachment of a smaller blade that can be replaced at the moving, venting end of the adjustable body. However, having the moving body as one in the same as the venting device (e.g., blade) is preferable from, for example, the efficiency of material usage and avoidance of system complexity.

Figure 23:
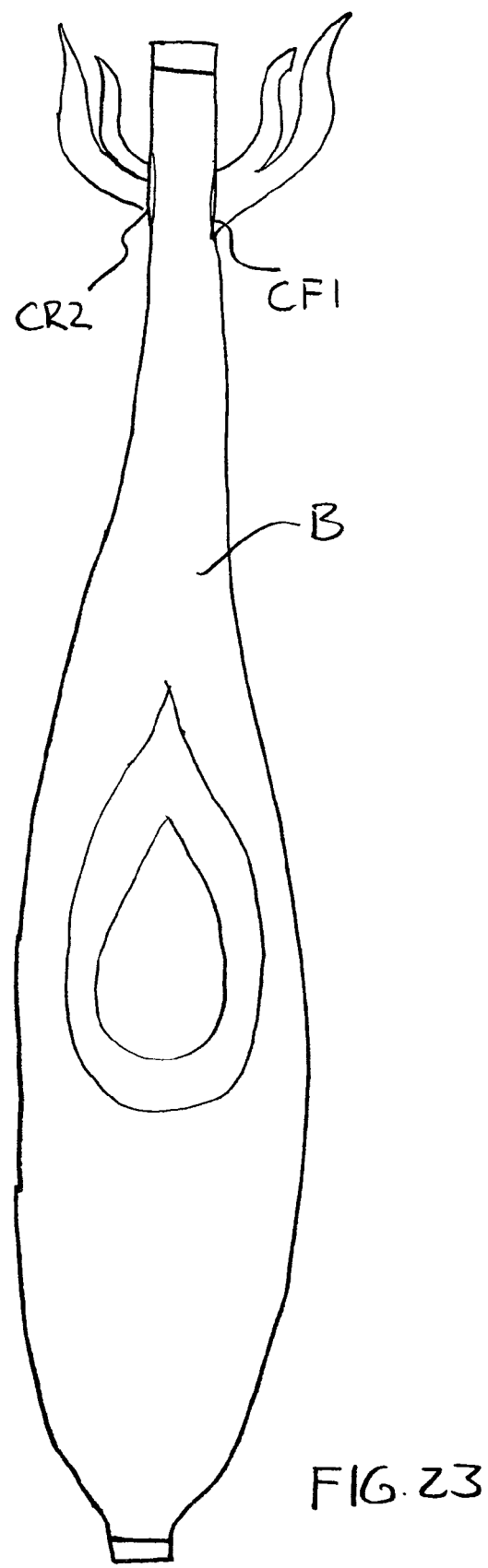
FIG. 23 shows an edge view of the bag in FIG. 21.

FIGS. 21 to 23 illustrate an example of a foam-in-bag product produced by the foam-in-bag dispensing system of the present invention. As seen from these figures, the introduced foam precursor begins to expand as represented by the pear shaped expansion region EP and in so doing releases off gas G through the vents formed. Utilizing the dual venting system previously described as a preferred embodiment produces two front vent cut CF1 and CF2 and two rear vent cuts (only one of two shown as CR2 in FIG. 23) for a total of 4 cuts. The first cut set is formed by a common blade preferably being in an upper corner region as in within 10% of the film width relative to the common fold CF of the C-fold film illustrated, and preferably within 10% of overall film length (generally top and bottom between seals TS1 and TS2). Also, the vent cuts preferably extend in the direction of film travel or longitudinally along the elongated length of the film being supplied. The second set is more inward as in within 30% of the C fold edge CF and preferably at the same height as the first set. For example, for a 12 inch width film CF1 is preferably positioned an inch or two inward of CF while CF2 is positioned, for example, 3 to 4 inches inward, which positioning also preferably corresponds with the cane positioning locations. For a 19 inch width film, a suitable percentage variation can be utilized or, more preferably, the same cane replacement driven placement can be utilized (the present invention preferably couples the cane function with the blade cartridge, but other variants are featured as interposing cutting blade cartridges at locations other than cane locations and/or using support locations other than a rear wall location as in an internalized driver within a hollow roller drive shaft moving in an out a blade supported by a drive roller ring, etc.) A variety of vent formation variations are also featured under the present invention including moving the vent formation means to one or more different locations along the film width or length with a few examples represented by dashed cut lines CF3 and CF4 which generally represent opposite counterparts for the right side as compared to CF1 and CF2 on the left side and preferably correspond to cane locations on that side. Also, to avoid potential leakage for materials often relied upon for foam generation, the cuts formed are typically within an inch length as in a 0.5 inch being illustrative of a suitable length well designed for a four vent embodiment. Possible variations in vent length are represented by the different lengths for CF3 and CF4, which length can be varied in real time via a control unit in communication with the blade driver which, for example, times the extension of the cutting blade through the film material and then back through the film material to its non-venting home position.

The present invention also features a method of venting a foam-in-bag product including forming a front and rear film layer vent aperture or cut with an adjustable device as in an adjustable blade device that has a cutting edge positioned within the confines of a pair of film driving units as in a pair of film drive nip rollers. In a preferred embodiment a blade cartridge is provided with a driver for moving the blade in and out of the cartridge and with the cartridge being positioned within a nip zone of the two rollers and with the blade preferably extending past the plane of the film (e.g., through the film itself) and into the circumference of an opposing roller with that roller preferably having a material softer than the blade for receiving the blade as in a silicone ring provided in a groove of a metal roller. The cartridge is also preferably positioned to replace or assume a cane location in the film feed system and with the cartridge having a cane or anti-film wrap around configuration to work with, for example, other canes to avoid film wrap around. Also, the method of the invention includes a retrofitting operation wherein preexisting canes are replaced with the noted cartridges. The method of the present invention further includes a method of vent system servicing (e.g. placing in position or removing) that is tool-less and features an adjustment of a lock lever to release a clamping component as in a pivoting driver support section which functions to hold in place the cartridge while supporting the driver for blade adjustment when the lock down means is activated as in a locking lever with expanded head and shaft received within a slot formed in the driver support. Also, a base mount is preferably provided that is attachable or contactable to a frame structure of the film formation means as in a space between a back wall of a structure supporting the rollers and a cane rod also supported by that structure. The base mount provides a common support for the driver support supporting the driver and the cartridge when slid into place within a slot formed in the base section of the base mount.

What is claimed is:

1. A venting system for use in a foam-in-bag dispensing system, comprising:
   a venting device having a base supported on a support of the foam-in-bag dispensing system, an adjustment device supported by said base, and a drive device in driving communication with said adjustment device;
   said adjustment device including a film material vent formation device which is moved by said drive device between a vent formation mode and a non-vent formation mode, and wherein, said adjustment device comprises a housing for said vent formation device, and wherein said housing includes a film contact edge that, in use, extends beyond, relative to film travel, a point of compression between two nip drive rollers of the foam-in-bag dispensing system to facilitate the avoidance of nip drive roller film wrap around.

2. The venting system of claim 1, wherein said vent formation device comprises a blade adjustably supported by said base to move from the non-vent formation mode position, wherein said blade is positioned to a first side of the film material being vented that is closest to a support point of the blade relative to said base, to a vent formation mode position, wherein the blade includes a blade segment that is positioned to an opposite or second side of the film material.

3. The venting system of claim 2, wherein the blade segment travels within a nip region of of the nip drive rollers, and said nip region extends between diametrically opposite points of one of said drive rollers.

4. The venting system of claim 1, wherein said adjustment device is slidably received within a recess provided in said base with said drive device blocking said adjustment device from release from said recess when said drive device is in a lock-in position state, and said drive device adjusts to expose for removal said adjustment device when said drive device is in an unlocked state.

5. A venting system for use in a foam-in-bag dispensing system, comprising:
   a venting device having a base supported on a support of the foam-in-bag dispensing system, an adjustment device supported by said base, and a drive device in driving communication with said adjustment device;

said adjustment device including a film material vent formation device which is moved by said drive device between a vent formation mode and a non-vent formation mode, and wherein the foam-in-bag film dispensing system includes a pair of drive rollers having a maximum compression film drive contact location falling within a nip region, and said vent formation device comprises a blade segment which travels through said film material and into a groove formed in one of the film drive rollers.

6. The venting system of claim 5, further comprising a ring insert positioned in the drive roller groove and formed of a material better suited for repeated cuts by the blade segment relative to the driver roller material.

7. The venting system of claim 5, wherein said blade segment is adjusted by said drive device to cut through a pair of layered film material within 1 cm of the maximum compression location.

8. The venting system of claim 5, wherein said adjustment device further comprises a blade housing which has a recessed section for engagement with a cane support rod of the foam-in-bag dispensing system.

9. The venting system of claim 5, wherein said adjustment device comprises a blade cartridge comprising a blade as said film material vent formation device and a blade housing, which blade housing is dimensioned such that said blade is retracted within said housing when in the non-vent formation mode and has a blade segment that extends out from said housing and into film material contact when in vent formation mode.

10. The venting system of claim 5, wherein said adjustment device comprises a housing for said vent formation device which housing is dimensioned as a film wrap around prevention means.

11. The venting system of claim 10, wherein said housing includes a film contact edge that extends through a film drive nip region zone.

12. A venting system for use in a foam-in-bag dispensing system, comprising:
a venting device having a base supported on a support of the foam-in-bag dispensing system, an adjustment device supported by said base, and a drive device in driving communication with said adjustment device;
said adjustment device including a film material vent formation device which is moved by said drive device between a vent formation mode and a non-vent formation mode, and wherein said adjustment device comprises a housing for said vent formation device, and
wherein said housing is received within a notched region of one of a pair of nip drive rollers which pair of rollers is in driving contact with the film material being vented.

13. The venting system as claimed in claim 12, wherein said venting device has releasable support rod mounting means which provides for film wrap-around prevention means replacement by said venting device while retaining a film wrap-around prevention function.

14. The venting system as recited in claim 12, wherein said base pivotably supports said drive device between a driving operation mode and a non-driving operation mode, and wherein when said drive device is in said driving operation mode said adjustment device is locked in position, and when said drive device is in said non-driving operation mode said adjustment device is releasable in a tool-less manner.

15. A venting system for use in a foam-in-bag dispensing system having a roller set for film material feed, wherein the roller set forms a nip roller region, said venting system comprising:
a base;
an adjustment device supported by said base;
a drive device in driving communication with said adjustment device to adjust said adjustment device between a film material vent formation mode and a film non-vent formation mode, and wherein said adjustment device includes a vent formation device that is driven toward the film material while the film material is within the nip roller region; and
a lock down device that releasably locks said drive device into an operational drive engagement position relative to said adjustment device while also clamping into operational position said adjustment device when in a lock down mode and provides for tool-less release of said adjustment device when said lock down device is released from the lock down mode.

16. The venting system as recited in claim 15, wherein said adjustment device comprises a blade cartridge and said base includes a reception slot which slidingly receives said blade cartridge, and said blade cartridge comprising a housing as well as a blade which provides said film material vent formation device and has a portion in contact with said driver device and is adjustably supported within said housing for movement into and out of said vent formation mode in conjunction with drive device movement.

17. The venting system as recited in claim 16, wherein said blade has a cutting edge positioned adjacent to the film material and a pivot support and a driver contact segment which is in contact with said driver device.

18. The venting system as recited in claim 15, wherein said adjustment device is a blade cartridge that comprises a blade as said vent formation device and a blade housing, with said blade having a film material contact blade segment retracted within said housing when in the non-vent formation position and extending away from said housing and to an opposite side of the film material when in the vent formation mode.

19. The venting system of claim 18, wherein said drive device includes an eccentric cam in driving contact with a segment of said blade which is in an exposed state relative to said blade cartridge housing and wherein said blade is pivotably supported within said housing and placed in said vent formation position upon adjustment by said eccentric cam.

20. The venting system as recited in claim 15, wherein said base comprises a recessed region dimensioned for support rod reception, an access aperture for receipt of said vent formation device, and a pivot post support that pivotably supports said drive device; and said lock down device includes a lock member also supported by said base.

21. The method venting system of claim 15 wherein said vent formation device venting has a film contact segment that moves within an angle of 5° or less.

22. A venting system for use in a foam-in-bag dispensing system, comprising:
a first venting device having a base supported on a support of the foam-in-bag dispensing system, an adjustment device supported by said base, and a drive device in driving communication with said adjustment device;
said adjustment device including a film material vent formation device which is moved by said drive device between a vent formation mode and a non-vent formation mode, and wherein said base includes a capture recess configured for releasable connection with a support of the foam-in-bag dispensing system and said venting system further comprising a friction enhancing compressible material member, which, in conjunction with the capture recess, provides for a tool-less connection of said base with the support of the foam-in-bag dispensing system.

23. The venting system of claim 22, wherein the capture recess is a hook-shaped capture recess and wherein the support of the foam-in-bag dispensing system is a support rod which is received by the capture recess.

24. A venting system for use in a foam-in-bag dispensing system, comprising:
a first venting device having a base supported on a support of the foam-in-bag dispensing system, an adjustment device supported by said base, and a drive device in driving communication with said adjustment device:
said adjustment device including a film material vent formation device which is moved by said drive device between a vent formation mode and a non-vent formation mode,
wherein said base includes a capture recess configured for releasable connection with a support of the foam-in-bag dispensing system and wherein said base is releasably connected, in tool-less fashion, with the foam-in-bag dispensing system, and
wherein said drive device is adjustably supported between a drive operation mode with said adjustment device and a non-drive operation mode with said adjustment device, and wherein, when said drive device is in said drive operation mode, said adjustment device is blocked from release by said drive device and when said drive device is in said non-drive operation mode said adjustment device is in an unblocked and tool-less release state relative to a support state with said base.

25. The venting system of claim 24, further comprising a second venting device supported by the foam-in-bag dispensing system and being spaced apart from said first venting device.

26. The venting system of claim 25, wherein said first and second venting devices are of a common configuration and interchangeable in operational position relative to the foam-in-bag dispensing system.

* * * * *